United States Patent [19]

Kolton et al.

[11] Patent Number: 5,778,357
[45] Date of Patent: *Jul. 7, 1998

[54] MARKET INFORMATION MACHINE

[75] Inventors: Anthony D. Kolton, Chicago, Ill.; Ruben A. Gamboa; Danette S. Chimenti, both of Austin, Tex.

[73] Assignee: Logical Information Machines, Inc., Chicago, Ill.

[ * ] Notice: The term of this patent shall not extend beyond the expiration date of Pat. No. 5,414,838.

[21] Appl. No.: 777,123

[22] Filed: Dec. 30, 1996

Related U.S. Application Data

[63] Continuation of Ser. No. 392,612, Feb. 22, 1995, Pat. No. 5,590,325, which is a continuation of Ser. No. 713,359, Jun. 11, 1991, abandoned.

[51] Int. Cl.⁶ ........................................................ G06F 17/30
[52] U.S. Cl. ........................ 707/2; 707/4; 707/6; 707/104
[58] Field of Search .................................... 395/601, 602, 395/603, 606, 615, 237; 707/2, 4, 6, 104

[56] References Cited

U.S. PATENT DOCUMENTS

| | | | |
|---|---|---|---|
| 4,688,195 | 8/1987 | Thompson et al. | 364/300 |
| 4,823,265 | 4/1989 | Nelson | 364/408 |
| 4,829,423 | 5/1989 | Tennant et al. | 364/200 |
| 4,866,638 | 9/1989 | Cosentino et al. | 364/521 |
| 4,914,590 | 4/1990 | Loatman et al. | 364/419 |
| 5,008,853 | 4/1991 | Bly et al. | 364/900 |
| 5,038,284 | 8/1991 | Kramer | 364/408 |
| 5,072,412 | 12/1991 | Henderson, Jr. et al. | 395/159 |
| 5,101,353 | 3/1992 | Lupien et al. | 364/408 |
| 5,175,814 | 12/1992 | Anick et al. | 395/161 |
| 5,189,608 | 2/1993 | Lyons et al. | 364/408 |
| 5,220,500 | 6/1993 | Baird et al. | 364/408 |
| 5,241,671 | 8/1993 | Reed et al. | 395/600 |
| 5,267,148 | 11/1993 | Kosaka et al. | 395/237 |
| 5,297,031 | 3/1994 | Gutterman et al. | 395/237 |
| 5,297,032 | 3/1994 | Trojan et al. | 395/237 |
| 5,335,323 | 8/1994 | Kolnick | 395/340 |
| 5,339,392 | 8/1994 | Risberg et al. | 395/333 |
| 5,347,452 | 9/1994 | Bay, Jr. | 364/408 |
| 5,414,838 | 5/1995 | Kolton et al. | 395/615 |
| 5,590,325 | 12/1996 | Kolton et al. | 395/615 |

OTHER PUBLICATIONS

"A Temporal Model and Query Language for ER Databases," by Raimez Elmaari, Univ. of Houston and Gene T. J. Wuu, Bell Communications, *Sixth International Conference on ER Databases*, Feb. 5–9, 1990, pp. 76–83.

"Paradox Relational Database Version 3.5—Introduction to Paradox," selected pages of Introduction and User Guide, Borland International, 1985, 1990.

*Primary Examiner*—Wayne Amsbury
*Attorney, Agent, or Firm*—Fitch, Even, Tabin & Flannery

[57] ABSTRACT

A computerized data retrieval system, especially for commodity price information databases, having a windowing system which aids a user in creating and revising formal search language queries, a database searching engine responsive to such queries, means to generate and format results in both textual and graphic reports, and a capacity for echoing a formal search language query to a display in a near-natural language format for easy comprehension by the user as the query is constructed using the windowing system. The system has facilities for including domain knowledge in a query, such as market knowledge of calendar events, national holidays, triple-witching hours, and option contract expiration dates. The system has additional facilities that permit a user to include more fundamental domain knowledge, such as dates of political elections, date of issuance and value of company earning reports, the consumer price index, and so on. The near-natural language format of the query may be created and revised either through the windowing system or with a text editor.

14 Claims, 24 Drawing Sheets

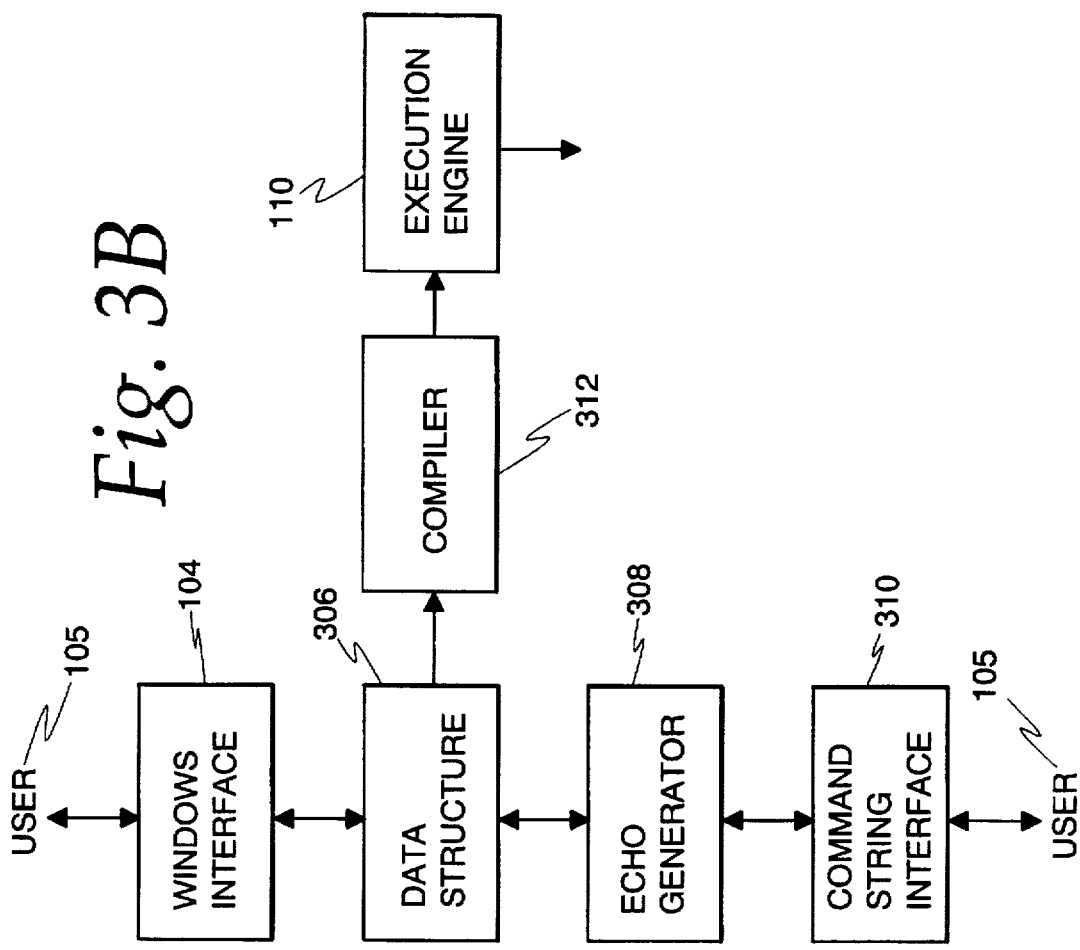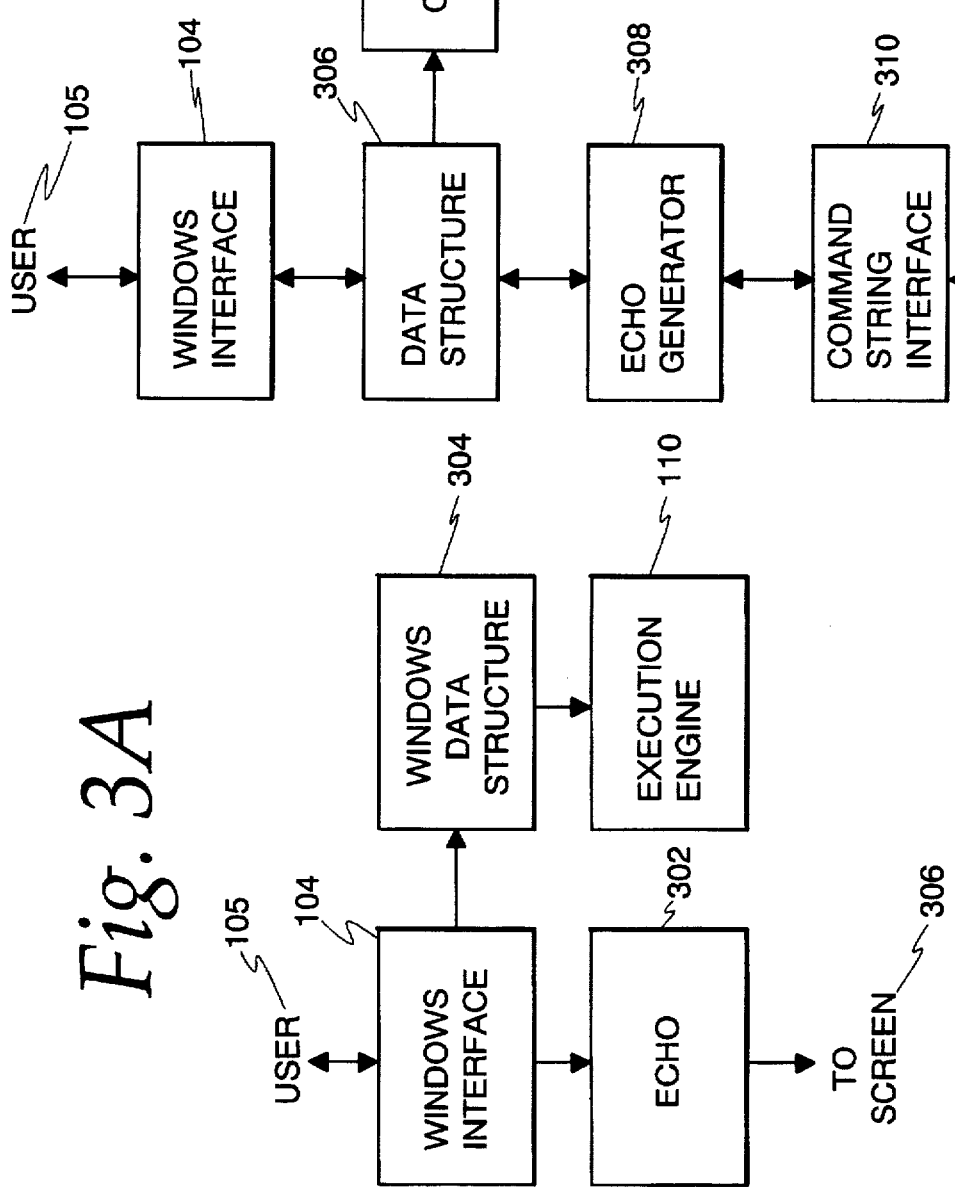

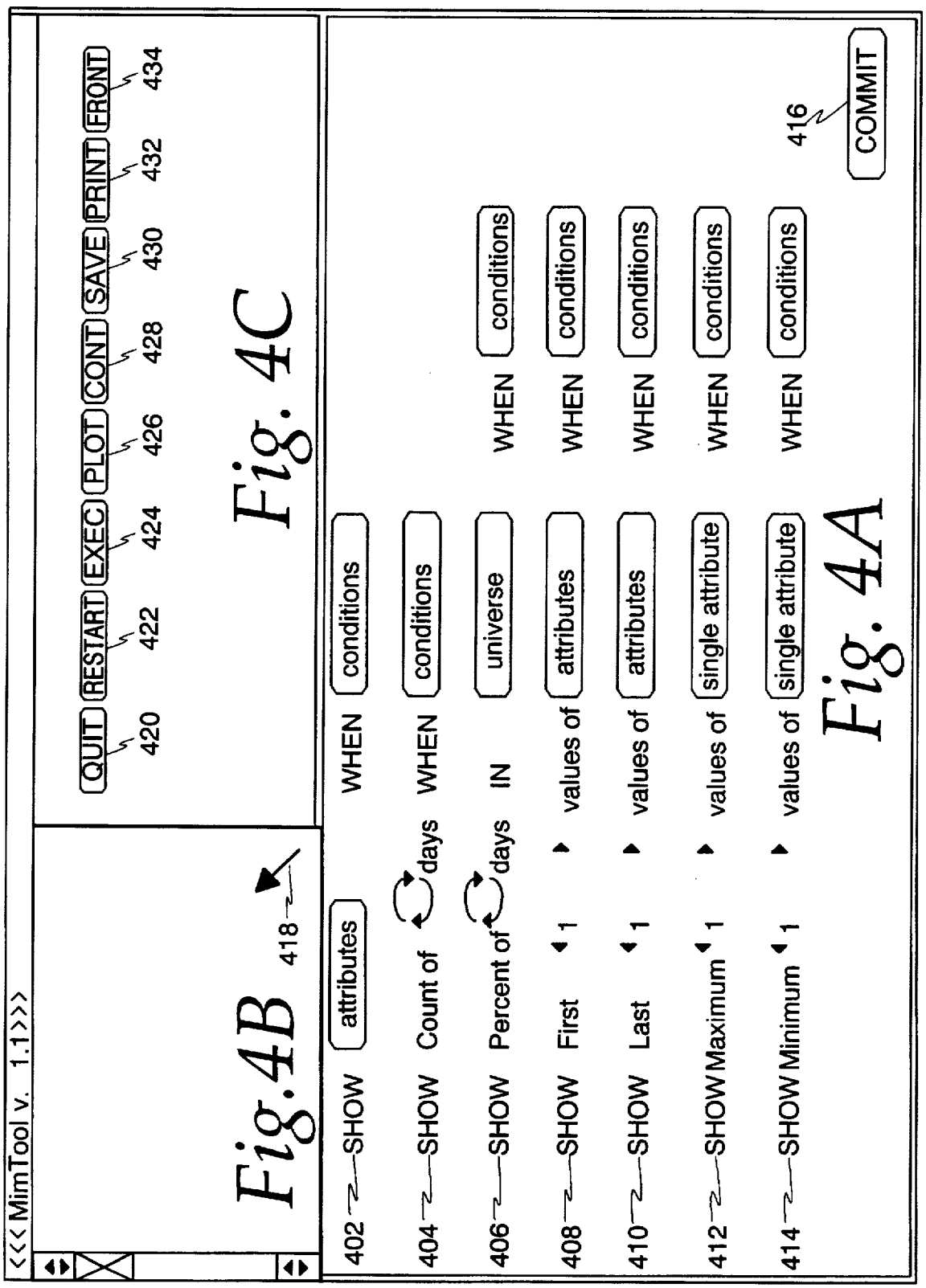

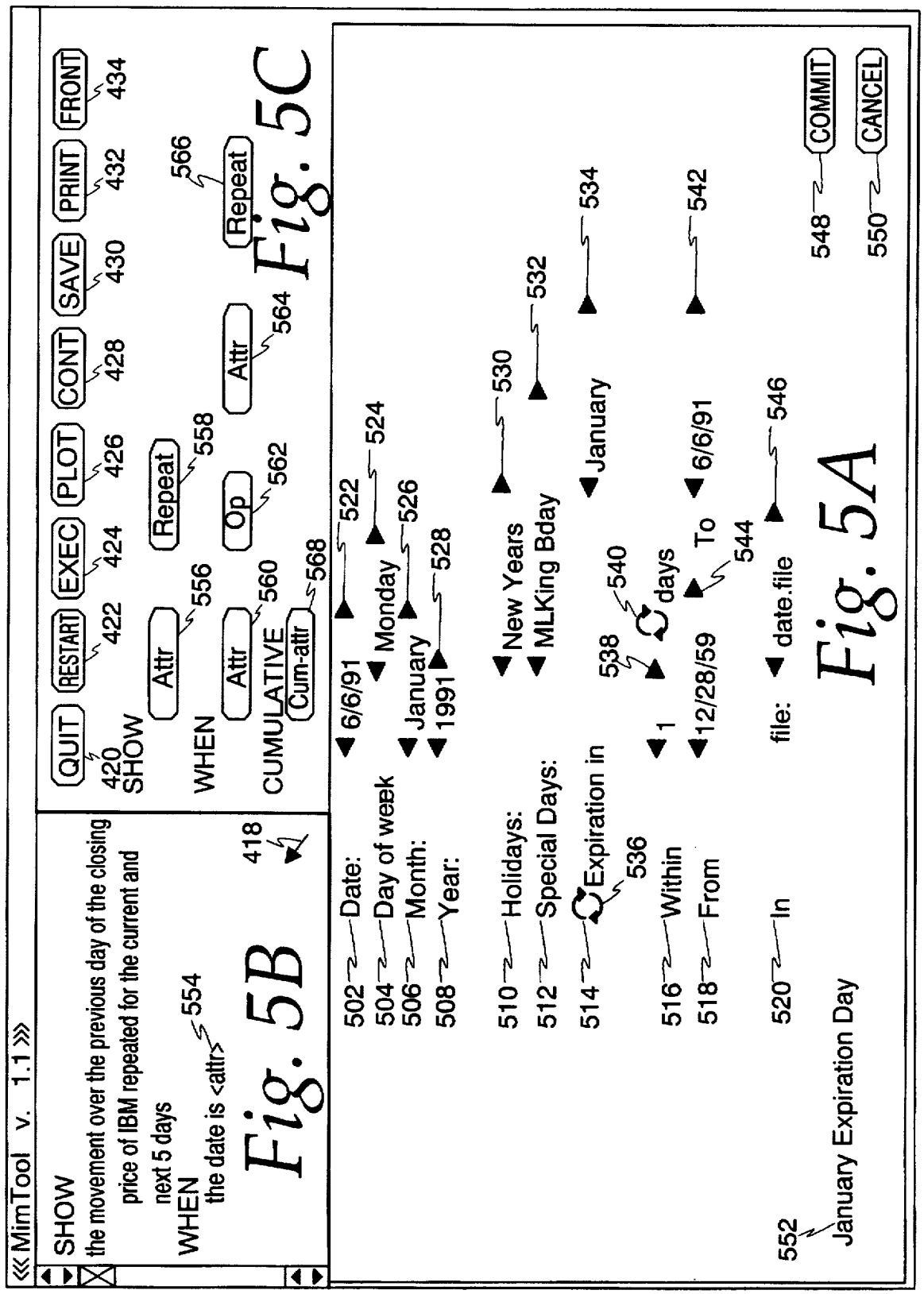

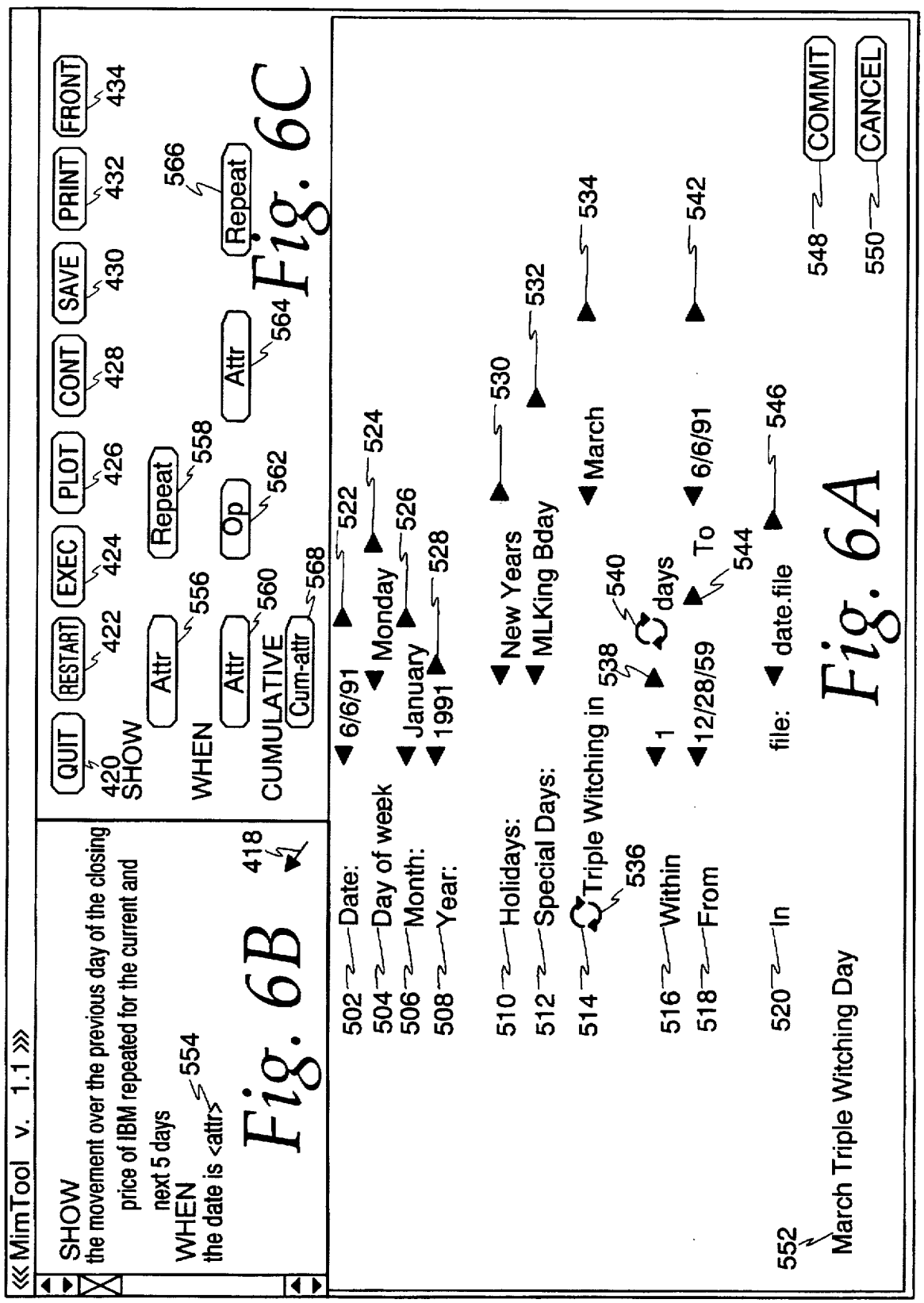

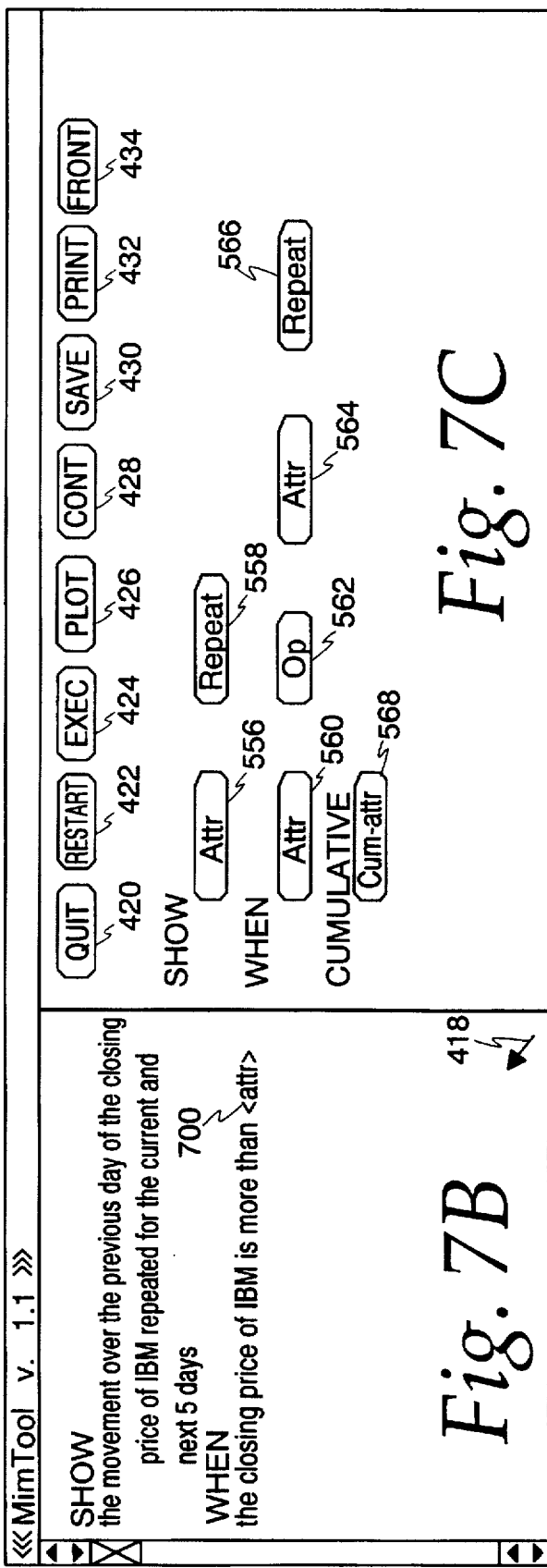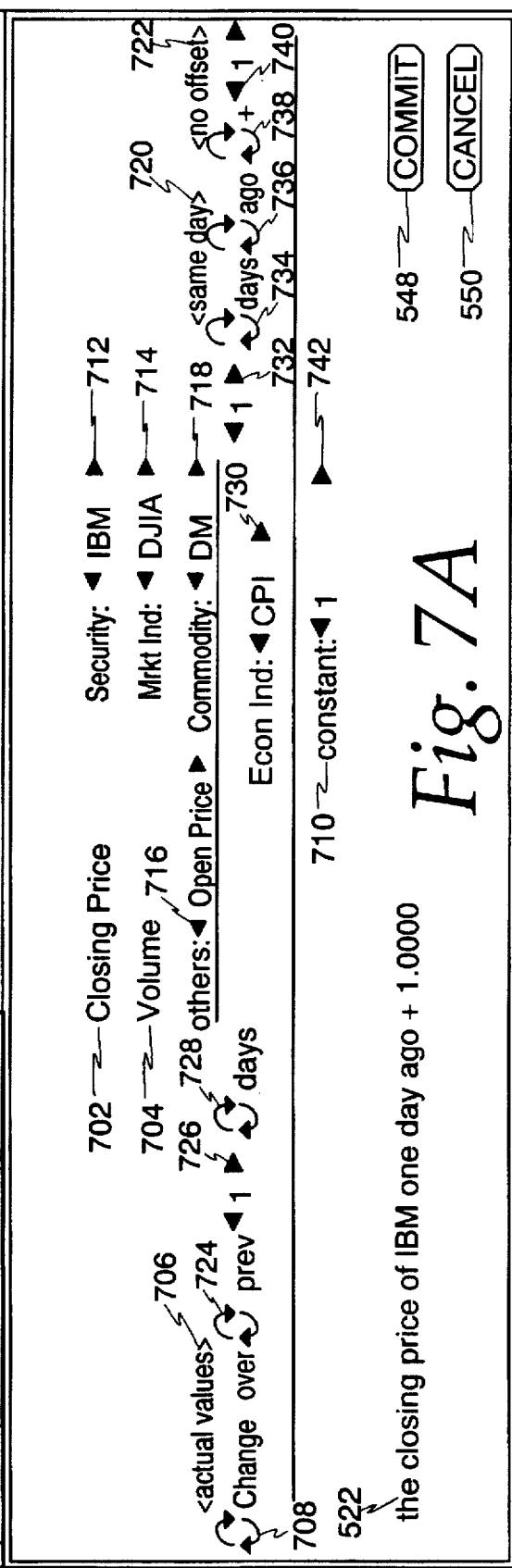

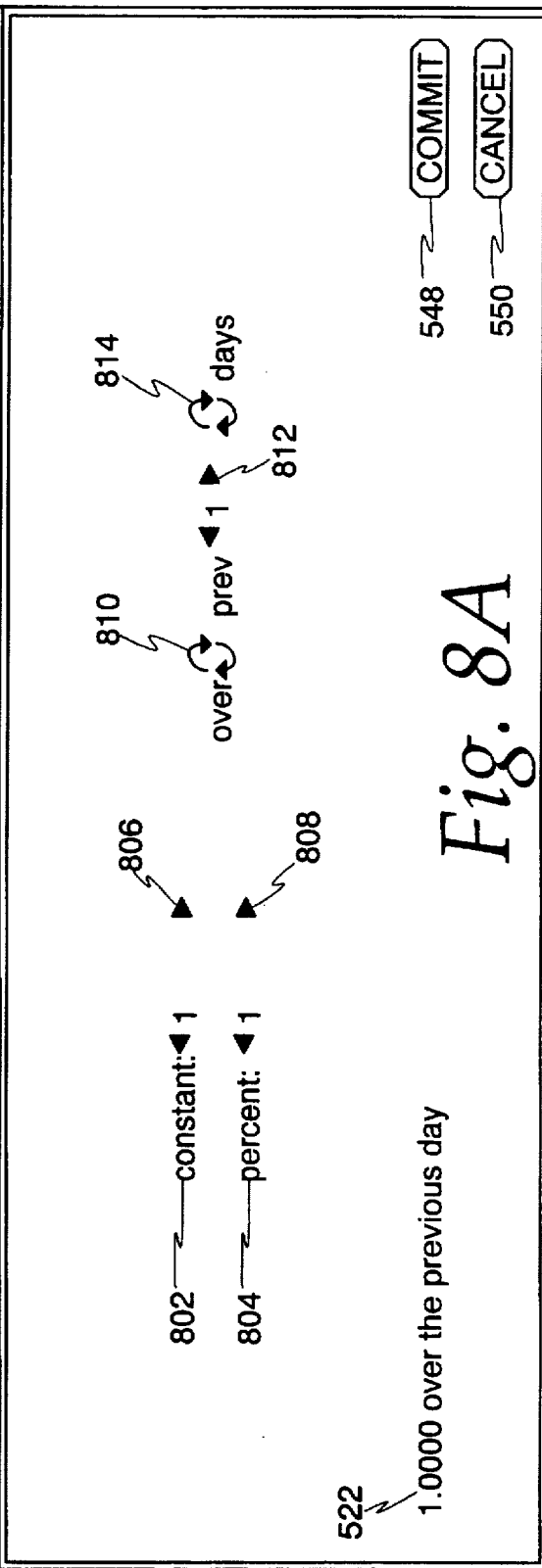

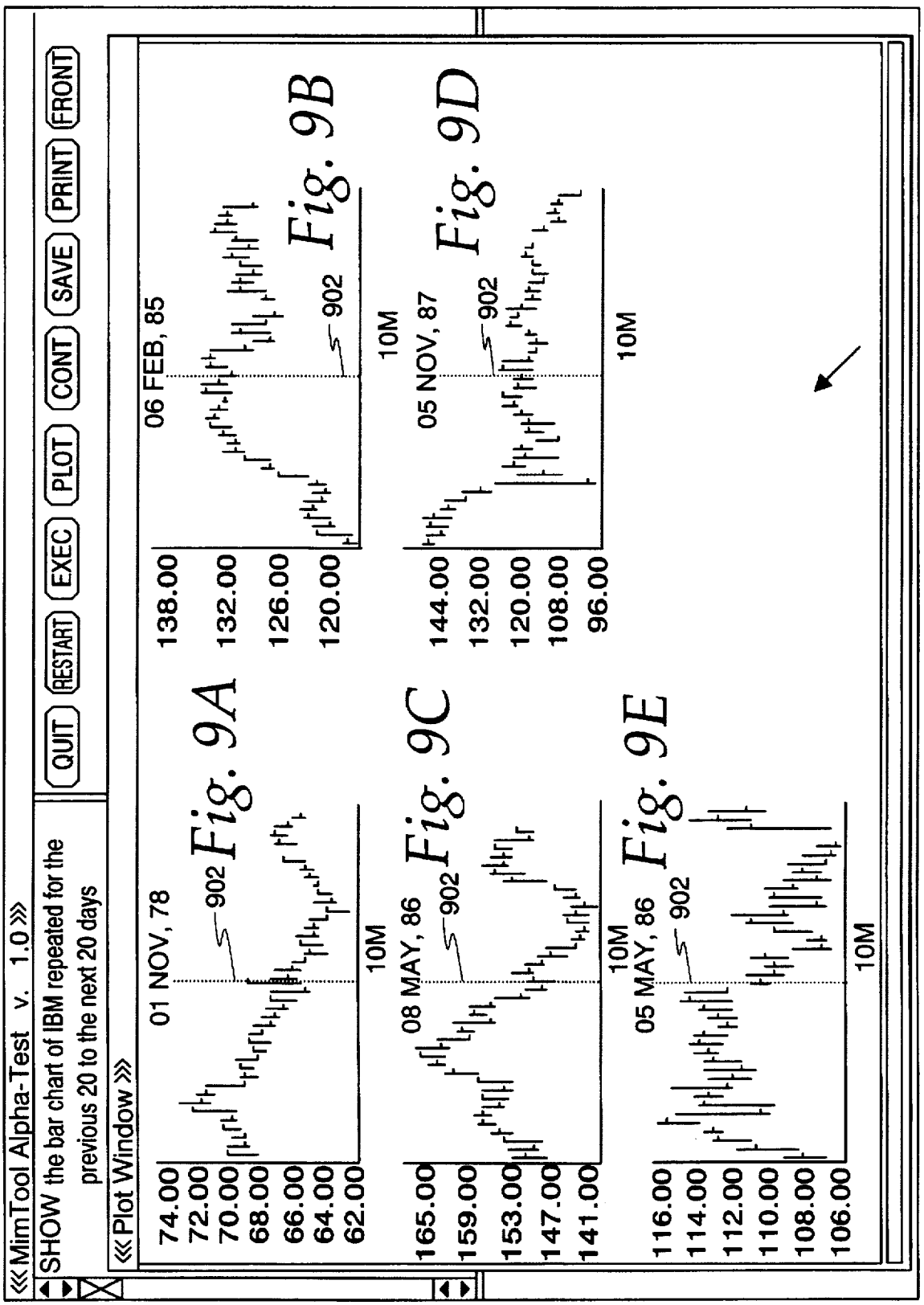

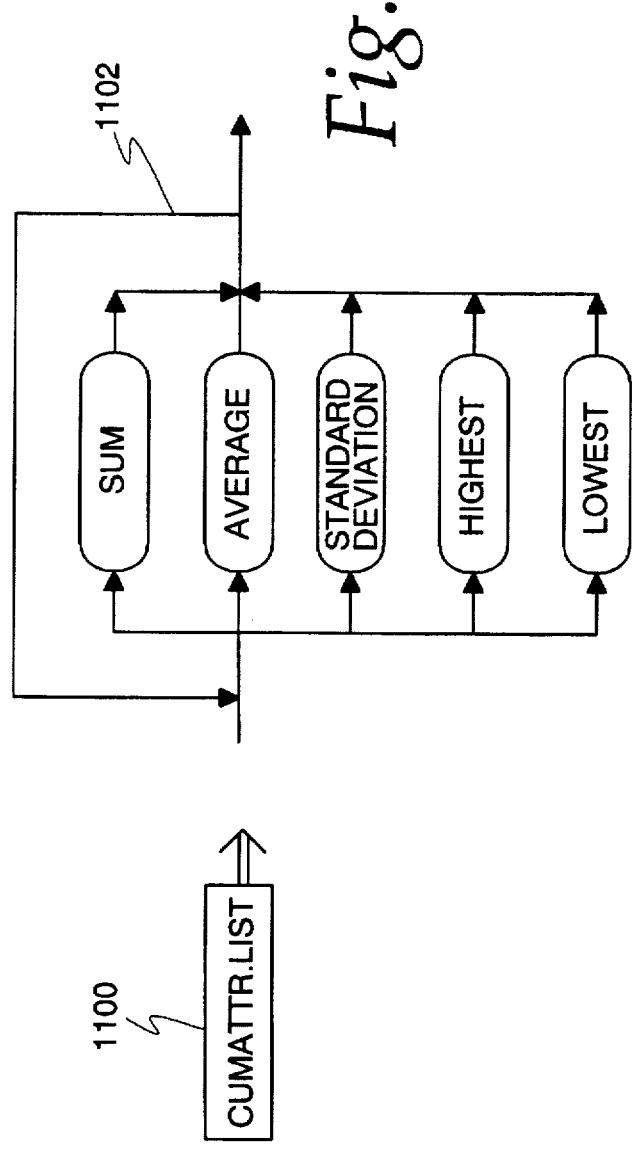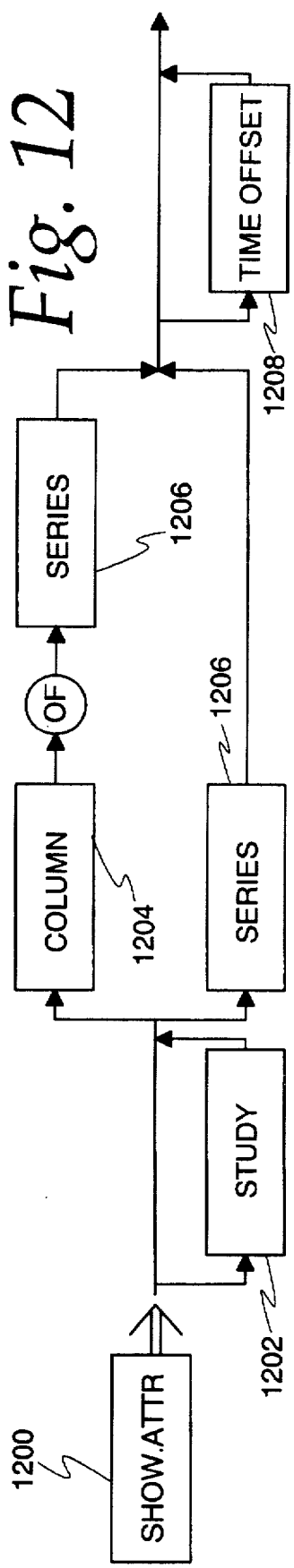

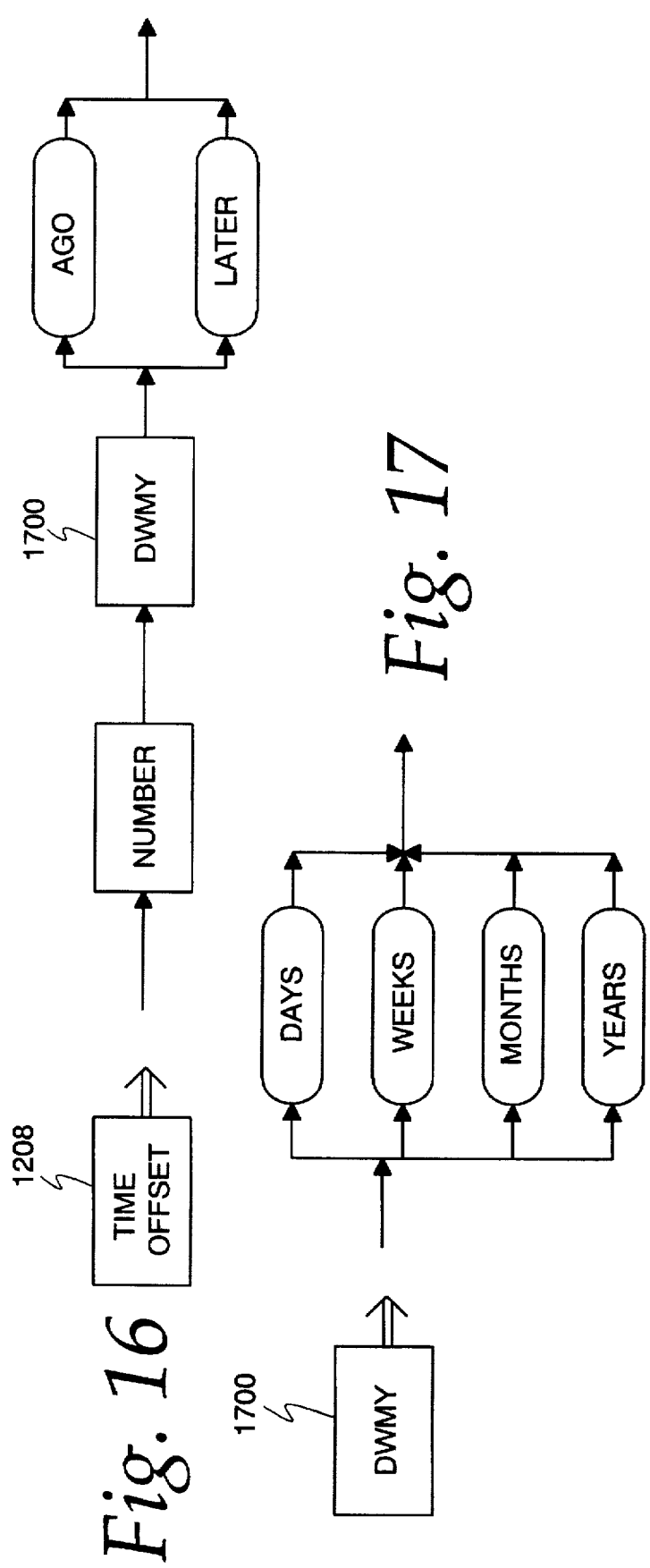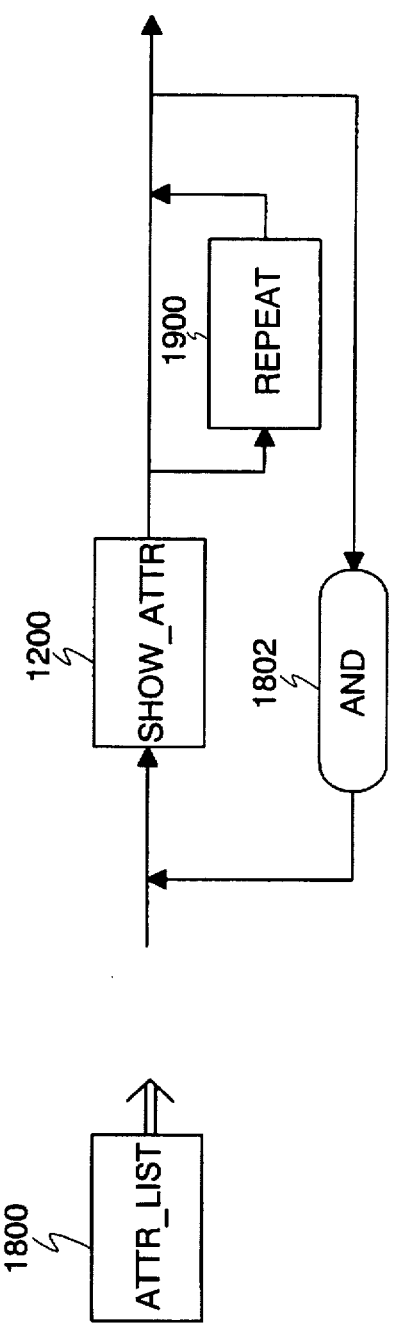

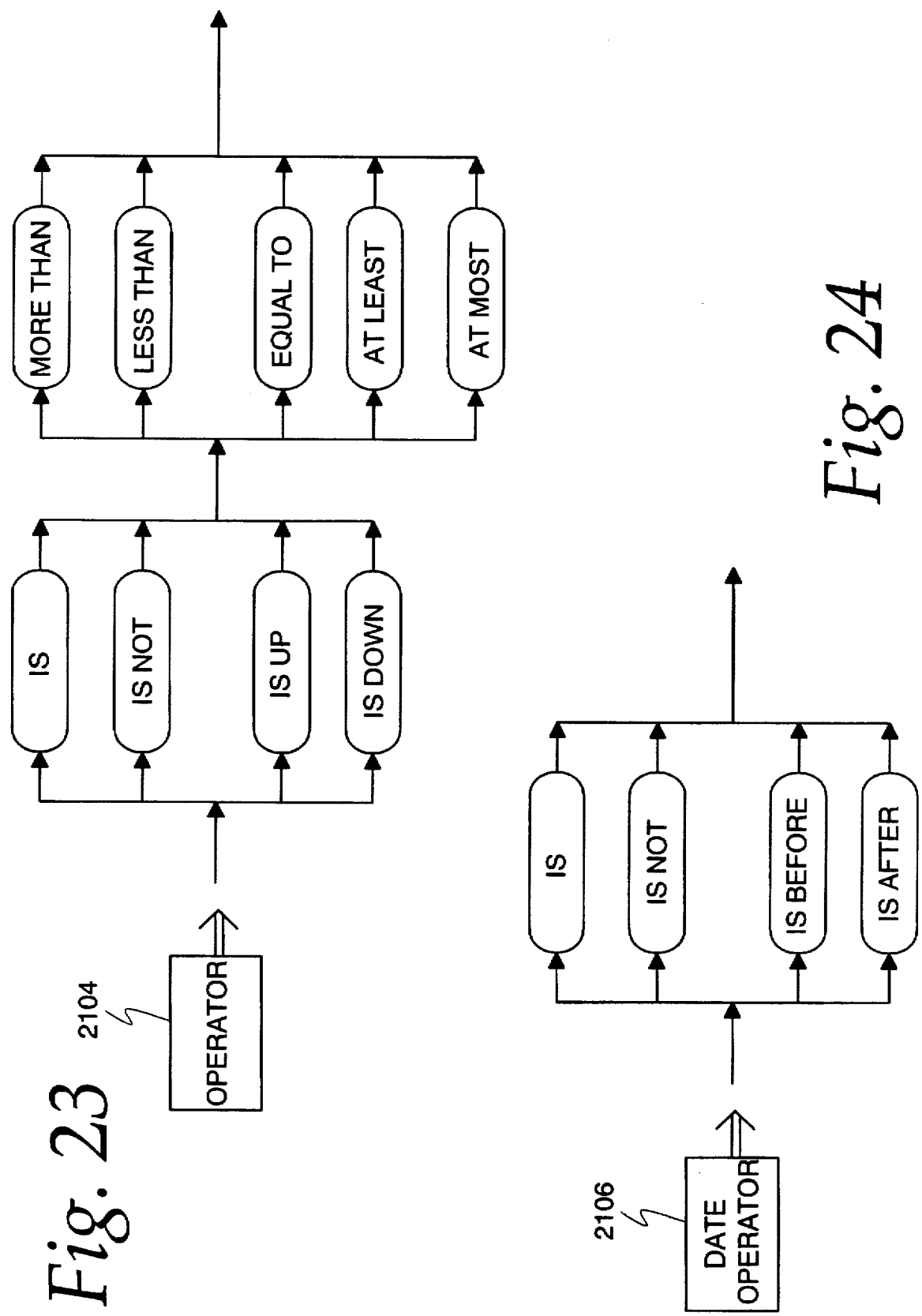

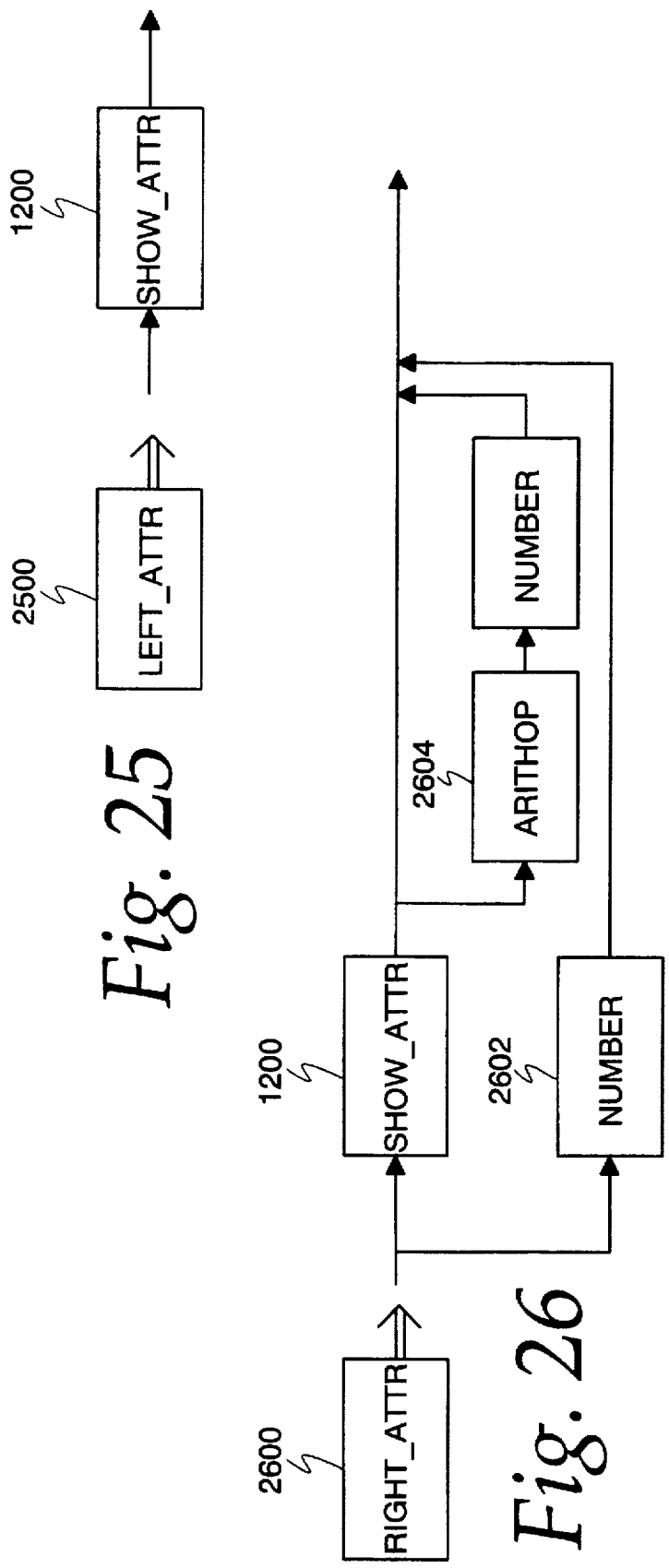
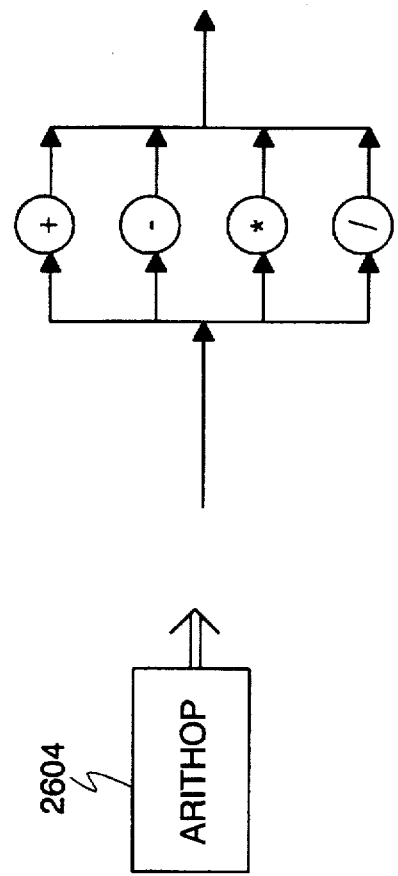
Fig. 25
Fig. 26
Fig. 27

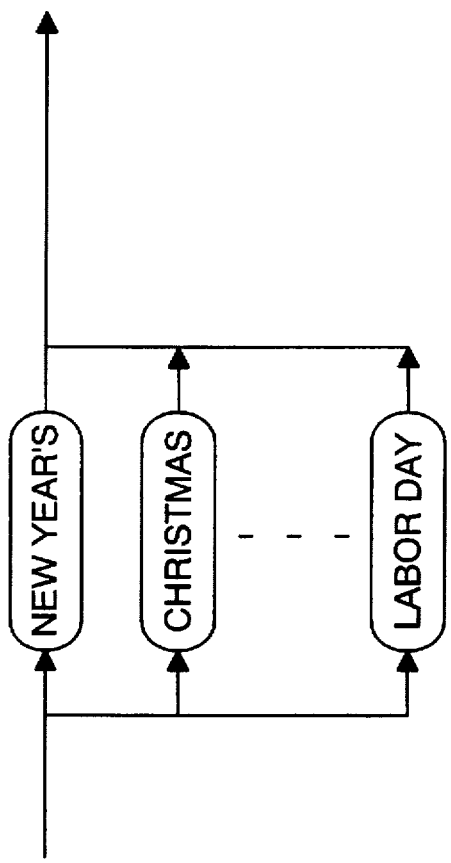
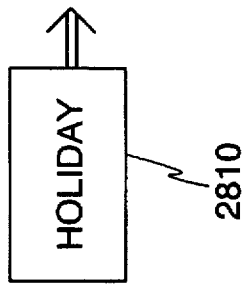
Fig. 32

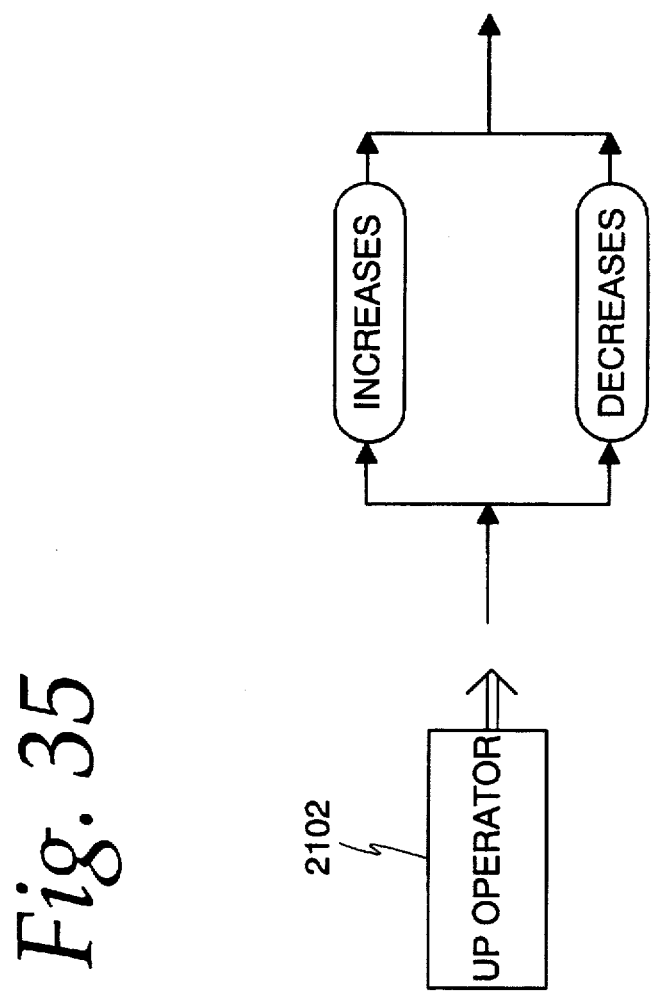

MARKET INFORMATION MACHINE

This application is a Continuation of U.S. Ser. No. 392,612, filed Feb. 22, 1995, now U.S. Pat. No. 5,590,325 which issued on Dec. 31, 1996 which is a Continuation of U.S. Ser. No. 713,359, filed Jun. 11, 1991.

FIELD OF THE INVENTION

The present invention relates to automated information search and retrieval systems, and more particularly to systems designed to facilitate research into the fluctuations of commodity markets and the like over time, such as fluctuations in the stock market.

BACKGROUND OF THE INVENTION

Many different database systems exist that can aid one in searching through the history of stock market fluctuations. These systems permit one, for example, to request the value of a particular stock on a particular date. They permit one to ask to have plotted the fluctuations of one or more stocks over a particular range of dates.

It is also well known to provide a general purpose database system that includes a query language in which searches can be expressed in the form of a logical expression that utilizes AND and OR logical operators to conjoin various search conditions, several of which may relate to greater than or less than relations between algebraic expressions concerning the data. Examples of such systems are DBase III, Inmagic, SQL and PARADOX. Once a complex query is defined using the query formulation language of one these systems, the system typically provides for the construction of windows that prompt the user for the values needed to facilitate the evaluation of query. But systems designed for stock market research typically do not use windows to prompt the users through the construction of an entire query, particularly any general type of sophisticated query.

Using conventional systems and assuming that the necessary data is present within the system's database, it is always possible for a sophisticated programmer to come in and to design a database structure, a set of queries formulated in a formal language, and a set of reports similarly formulated in a formal manner, that can extract almost any kind of desired report from the data. However, the process of designing a particular query can be time consuming and expensive, since it typically requires programmer assistance. It is not something that can be done quickly and easily by a market trader or an institutional investment manager who is not skilled in programming.

Accordingly, a primary object of the present invention is to design a market information machine that permits traders and portfolio managers to pose sophisticated ad hoc queries against an extensive database containing historical stock, commodity, and economic data at a level that was previously not economical nor timely, so that high-level research can be performed quickly in a way that can substantially increase trading profits.

SUMMARY OF THE INVENTION

The present invention, briefly described, is a computer system that uses templates displayed to a user in a window to prompt a user who is a trader or portfolio manager through the entire process of creating a sophisticated search request. The same windowing system may be used to review and modify the query. The query is also echoed back to the user in the form of a search request formulated in near plain English to aid the user in understanding the query. The user need not understand computer programming. The user may also escape from the windowing point-and-click-mode of a query formulation and revise the near plain English expression of the search query directly with a few keystrokes.

In addition, the market information machine enables the user to combine a request for the retrieval of fundamental data relating to the value of a commodity on given dates with search limitations relating to technical trading rules, holidays and historical events, business events, government reports, and even particular days of the week, month, or year, all in the same easy and simple manner. For example, one can easily request a bar chart of U.S. bond prices on all days when the consumer price index report was released by the U.S. Government, when bonds were up on the preceding day, and limited to those occurrences that fall within ten days before or after a prime rate increase. Such a search could be further limited to stipulate that only those occurrences between Memorial Day and Labor Day when the prime rate was over 10% should be displayed.

Invention resides in combining stock price information with economic indicator information, market average information, and other forms of market domain knowledge to form a single database (or several databases accessible by the same program) and then providing a English-like query language powerful enough to formulate time and event limited search requests such as the above example that lends itself to search formulation entirely through the use of overlaid window prompts or, alternatively, through the use of a more natural language format within the confines of a single system that can be used by traders and portfolio managers who are not skilled in programming.

Further objects and advantages of the invention are apparent from the detailed description which follows, and the invention is defined with particularity in the claims annexed to and forming a part of this specification.

BRIEF DESCRIPTION OF THE DRAWINGS

FIGS. 3A and 3B are two different embodiments illustrating, in block diagram form, the way in which user queries are represented as a data structure defining overlapping windows, as a near-English command string, and as a data structure suitable for controlling the operation of a search request execution engine;

FIG. 4A is a pre-construction window appearing on the initial power-up screen of the market information machine (MIM);

FIG. 4B is a pre-compilation window appearing on the initial power-up screen of the MIM;

FIG. 4C is a machine command window appearing on the initial power-up screen of the MIM;

FIG. 5A is a pre-construction window showing the selection of the January expiration date;

FIG. 5B is a pre-compilation window shown with a prompt for the user to complete the attribute wheel;

FIG. 5C is a machine command window (the "show attribute") conditions". A pre-format has been collected from the pre-construction window;

FIG. 6A is a pre-construction window showing the selection of the

FIG. 6B is a pre-compilation window showing a prompt to select from the attribute field;

FIG. 6C is a machine command window showing the selection of the attribute field from the pre-format statement;

FIG. 7A is a pre-construction window showing the selection of the closing price of the IBM one day ago plus one point as a selection for the attribute field;

FIG. 7B is a pre-compilation window showing a prompt for the attribute field;

FIG. 7C is a machine command window showing the selection of the attribute field from the pre-format;

FIG. 8A is a pre-construction window showing the selection of one point over the previous day for the attribute field;

FIG. 8B is a pre-compilation window showing a prompt for an attribute field entry;

FIG. 8C is a machine command window showing the selection of an attribute field;

FIG. 9A is the first of five bar charts of IBM generated for the query shown in FIG. 8A, 8B and 8C; FIG. 9B is the second of five bar charts of IBM generated for the query shown in FIG. 8A, 8B and 8C; FIG. 9C is the third of five bar charts of IBM generated for the query of FIG. 8A, 8B and 8C; FIG. 9D is the fourth of five bar charts of IBM generated for the query of FIG. 8A, 8B and 8C; FIG. 9E is the fifth of the five bar charts generated for the query shown in FIG. 8A, 8B and 8C;

FIGS. 10 through 35 present, in flowchart form, a formal syntax definition of a near-natural retrieval language for use in the preferred embodiment of the present invention.

DETAILED DESCRIPTION OF THE PREFERRED EMBODIMENT a. A Hardware and Software Systems

Figure 1:
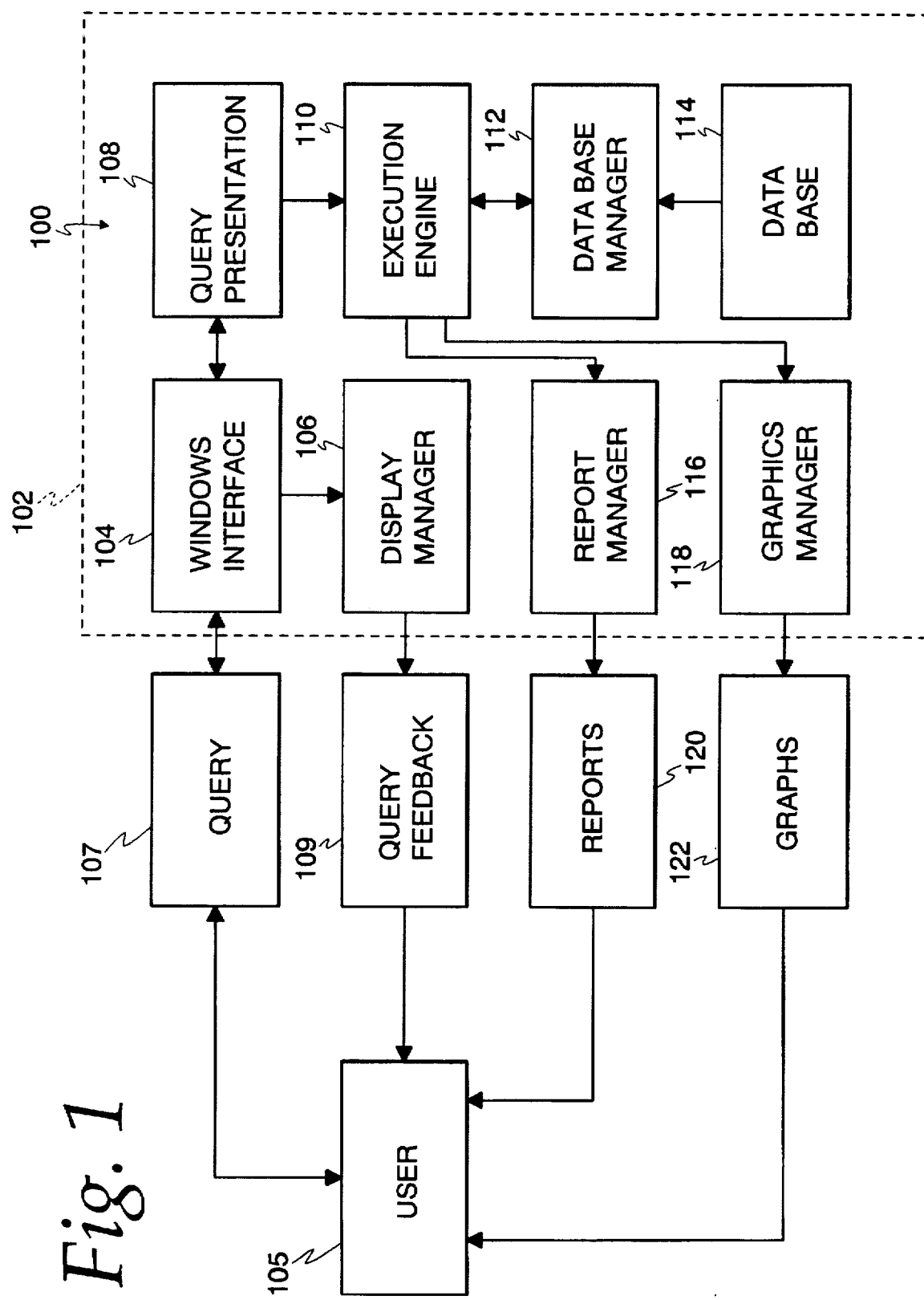
FIG. 1 is a overview block diagram of the system 100 which embodies the invention illustrating the way in which it interacts with the user when installed on a professional workstation.

The preferred embodiment of the invention is shown in block diagram form in FIG. 1 of the drawings. The invention is implemented on a professional workstation 102 which, in the preferred embodiment, falls within the Sun Microsystem, SUN3 or SUNSPARC family of workstations, or it may be a Hewlett Packard HP9000 Series 400 or 700 workstation. The operating system used in the preferred embodiment is SUN-OS 4.0.3 or higher, or HPUX 7.0 or higher. In addition, the workstation is equipped with x/MOTIF, the industry standard windowing software designed to work with Unix under X Windows.

The invention focuses upon the interaction between a user 105 and a system of programs 100 installed on the workstation 102 which results in the user being able to develop database queries 107 using a windows interface program 104 and to view the queries in a natural English form on the screen (query feedback 109) while preparing and revising the queries using the windows interface program 104 for guidance.

The windows interface program 104 provides a vehicle whereby the user may develop a query on the screen of the workstation 102. The windows interface program 104 places in front of the user 105 templates which list the alternative query 105 formulations that the user can select using a mouse pointing device and a typewriter to prepare specific queries. The query windows, illustrated below, correspond to the language options that are set forth in a formal description of the query language that is also presented below, and thus guide the user through all of the possible query formulations that the language is capable of achieving. As the query is developed, it is represented in a tree structure composed of the various overlapping windows that are used by the user to create the query. The query language is basically an English-like language especially tailored to be embedded within a window's prompting system. But the queries are equally capable of being represented in what appears to be normal English. Accordingly, as the query is developed, a natural English version of the query is developed by the windows interface 104 and is passed to the display manager 106 for presentation as query feedback 109 to the user 105, so that the user can see a natural English language expression of the query or partial query that has been developed. In one embodiment, the user may enter or edit the English language query expression directly, rather than enter or edit the query using the windowing prompts. This facility enables all users to save time, and advanced users may bypass the windowing system on occasion.

The query itself is represented internally as a query representation 108 which is, in reality, a database structure that defines the overlapping set of windows which the user uses to define the query. When the user is finished defining the query and calls for the generation of reports based upon the query, the query representation 108 is compressed into a more compact, parsable form from which redundancies have been eliminated and is passed to an execution engine 110 which parses the query and calls upon a database manager 112 to extract the necessary information from a database 114; to search through the data performing the called for logical, mathematical, time range, and numeric computations; and to present the resulting information to a report manager 116 and also to a graphics manager 118 which respectively prepare reports 120 and graphs 122 for display to the user 105.

With reference to FIG. 12.2, the database 114, in the preferred embodiment of the invention, contains individual stock price information 202 concerning the price of stock on a daily (and optionally on an hourly) basis over the years. In addition, the database contains market averages information 204, such as the Dow Jones averages each day over extended periods. The database 114 also contains economic indicators information 206, such as the consumer price index, the GNP, automobile production figures, IBM's sales and profits (for example), and other such indicators, together with the dates upon which this information is released if appropriate. In addition, the database 114 contains market domain knowledge 208 relating to dates that can have an influence upon the market; such dates as holidays, special holidays, triple-witching days, and option contract expiration days, for example. Dividend distribution dates are also included. The user may also add special databases, such as bear or bull market dates, for example. Even the dates of the lunar cycles may be added to the system for use in the market studies.

Figure 2:
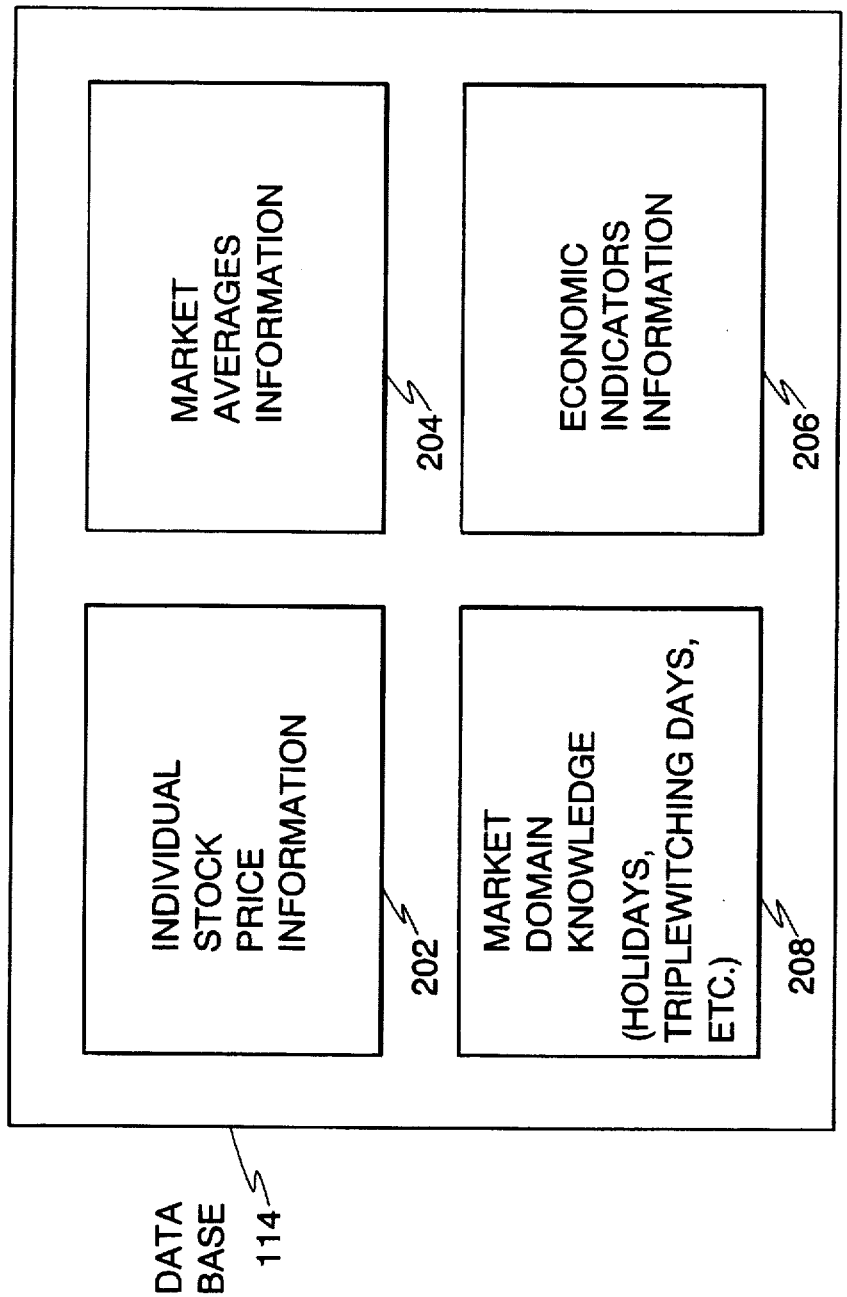
FIG. 2 is a block diagram of a database 114 element of the system 100.

The databases shown in FIG. 2 used in combination with the system 100 shown at FIG. 1 creates the potential for the user to generate reports that are of particular use to market traders and analysts in trying to examine past actions of the market at certain times, such as when dividends are paid or when special market events occur. In addition, the user may add the user's own market domain knowledge to the market domain knowledge 208 within the database 114 and thereby create a separate body of information for special reports. But to realize the potential of the database, a carefully human-engineered interface between the user 105 and the remaining parts of the system is provided in the form of the queries 107 which are implemented using overlapping windows and which are based upon an English-like search query language.

FIGS. 3A and 3B illustrate a way that user queries are processed in two different embodiments of the invention. In FIG. 3A, the user 105 interacts directly with the windows interface 104 to create and later to modify the query. During this interaction, information from the windows interface 104 enables an echo generator 302 to construct a natural language formulation of the query (or partial query) which is displayed on a screen 306 to the user but which is not directly editable by the user. When the query formulation process is completed, the windows data structure 304, created by the windows interface 104, is passed in a simplified form, stripped of redundancies, to an execution engine 110 which parses the data structure and then executes the database retrieval actions for and also causes the necessary reports to be generated, and formatted for printing and display. Note that report definition is inherent in the search query formulation process.

A second embodiment of the invention, illustrated in FIG. 3B, also permits the user 105 to interact with the user's windowface 104 to create a window data structure 306 that embodies the search request. The user 105 may then review and revise the query using the window interface just as in the embodiment of FIG. 3A. In addition, the echo generator 308 is designed to be bi-directional so that the window data structure 306 may be translated into an ASCII command string which is then presented to the user by a command string interface 310. The user may not only review the ASCII command string but may also edit the command string and revise it. Then the command string interface 310 reverses the process and essentially parses the command string back into a windows data structure 306 which may then be presented to the user 105 through the windows interface 104. The user is thus given the choice of entering and revising the query either by writing and revising an ASCII command string or by working through the series of overlaying window queries and prompts. Typically, a beginning user will stick with the windows queries and will only use the ASCII command string to make minor changes, as in the spelling of a particular stock name. Advanced users may then wish to save time by entering the query initially using the command string editing facility and possibly only use the windowing system to check out additional options that the user may have been forgotten. In either case, the final query data structure 306 is passed through a compiler 312 and is compiled into a compact tabular or tree form suitable for guiding the performance of an execution engine 110 through the tasks of retrieving the information, carrying out the relational steps called for by the search query, and generating and formatting the necessary reports.

b. The Window System That Interacts With The User

FIGS. 4A, 4B and 4C represent the windows which appear on the power-up screen of the market information machine (MIM). FIG. 4A is the query construction window. The query construction window is always located in the lower half of the MIM screen. On power-up, this window presents the user with seven query format options 402–404 to be used in the construction of queries to the market information database. Each of the seven query formats provide a unique framework to be used in the construction of a query for searching the database. The query format also defines the sequencing of the later MIM screens and the order in which the query is constructed. This provides autosequencing which walks the user through the query construction, thereby preventing the construction of bad queries. FIG. 4A shows option 402 as being selected because it is illustrated in darker print than the latter six options 404–414. Option format 402 defines a "show attributes when conditions" query format. Option 402 is selected by placing the mouse pointer 418, shown in FIG. 4B on option format 402 with the mouse and clicking-on option 402.

Other formats are defined in option 404–414. Option format 404 is the "show count of days when conditions" query format. Option format 406 is the "show percent of days in universe when conditions" query format. Option format 408 is the "first values of attributes when conditions" query format. Option format 410 is the "show last values of attributes when conditions" query format. Option format 412 is the "show maximum values of single attributes when conditions" query format. And, option format 414 is the "show minimum values of single attributes when conditions" query format.

Once the user has chosen one of the query formats 402–414, then the user completes the selection by moving the mouse to the COMMIT 416 and clicking. When the user is committed to a particular option 402–414, then the query format is defined. The query format will then appear in the machine command window (FIG. 4C) and its construction will be compiled according to a predetermined autosequencing of window menu selections on the MIM screen display. This construction takes place in the query construction window (FIG. 4A) and the compilation is shown in the query compilation window (FIG. 4B) as the query construction progresses.

FIG. 4B is the query compilation window on power-up. The query compilation window is located in the upper left-hand corner of the MIM screen. FIG. 4B is shown with a blank window because no commands have been compiled on power-up. The MIM is idle waiting for commands on power-up. The mouse pointer 418 is used to click on selections with the mouse.

FIG. 4C illustrates the machine command window on power-up. The machine command window illustrated in FIG. 4C is located in the upper right-hand corner of the MIM screen display. The window is shown empty on power-up because a query format has not been chosen. The machine command window will show the query format 402–414 which is being operated on by the user. Eight soft key commands are located along the top of the machine command window. QUIT 420 is used to terminate the query the MIM program. RESTART 422 is used to re-initiate a query command process. EXEC 424 is used when a query is completely constructed. Clicking-on EXEC 424 will begin execution of the database search with the query shown in the query compilation window. PLOT 426 will plot the results of a database search. Examples of plots are shown in FIGS. 9A–9E. CONT 428 is used to continue the execution of a command on the MIM when it has been paused. SAVE 430 is used to save the results of a query on the MIM. PRINT 432 is used to print the results of query. FRONT 434 is used to position windows at the front of the MIM screen display.

FIG. 5A illustrates a query construction window showing attribute field options 502–520. DATE option 502 allows the user to select a data in field 522 in order to use a specific date as an attribute for determining when to display market information from a particular date. Field 522 is shown with Jun. 6, 1991. Day of the week option 504 uses the day field 524 to select a particular day of the week by clicking on field 524 with the mouse and then typing in the day of the week. Day field 524 is shown having Monday selected as the desired day of the week. Month option 506 is used with field 526 to select a particular month as an attribute. Here, January is the selected month. Year option 508 is used with field 528 to allow the user to type in a particular year.

Illustrated here with 1991. HOLIDAYS option 510 is used with field 530 to select predetermined holidays by typing them into field 530. Major holidays such as Christmas and New Years are included. SPECIAL DAYS 512 is used with field 532 to allow the selection of attribute options corresponding to other important days of the year. Shown in field 532 is Martin Luther King's birthday. Other predetermined special days such as Lincoln's birthday, Washington's birthday or President's Day could also be used in option 512. Option 514 is used for menu selection. This is illustrated by a double-arrow icon 536. Icon 536 is shown having "Expiration in (month)" as being selected from the menu. Field 534 which is used to click on and type in the month of the option expiration date which the user is interested in. Menu selection double-arrow icon 536 is used to present other options to the user. When the user clicks on double-arrow icon 536 with the mouse, the user can select the option expiration date as shown in option 514. However, clicking-on the double-arrow icon 536 will change options to the triple-witching expiration date or the next dividend date for a particular stock. WITHIN OPTION 516 is used with unit field 538 and menu icon 540 to select an attribute of stock performance within a particular time period. Field 538 will select a number of time units of interest and icon 540 will change the units.

Icon 540 is used to select from a menu of time units for use in the WITHIN option 516. Other time units which will become available by a clicking on icon 540 are days, weeks, months, and years. FIG. 5A is shown with days selected by icon 540. FROM OPTION 518 is used with field option 544 and field option 542 to select an attribute for determining when to display market information by defining the attribute from a particular date 544 to a latter date 542. Option 518 is shown with the attribute from Dec. 28, 1959 to Jun. 6, 1991.

Options 502 through 518 are considered domain knowledge for the MIM, because they contemplate the use of predetermined dates for making database queries. Date, day, month and year information is preprogrammed into the query format structure of the MIM as are certain holidays, such as New Years and Christmas. Special days, such as Martin Luther King's birthday as illustrated in option 512, Lincoln's birthday, President's Day, and so on are preprogrammed. Special market dates are also preprogrammed into the MIM, these include ex-dividend dates for particular stocks, option expiration days in a particular month for a stock, and the triple-witching expiration dates. The domain knowledge offers flexibility in the standard construction of queries for the MIM database. This offers a great deal of flexibility for the user in making ad hoc queries about market conditions and testing the effectiveness of particular market rules for buying or selling stock or options. IN FILE option 520, however, allows the user added flexibility in that custom date attributes may be compiled by the user for the purpose of determining when to plot market information. These special dates, chosen by the user, are entered into a file and the file name is typed into field 546. FIG. 5A shows the date file typed into field 546. These dates may include dates corresponding to bull markets or bear markets, lunar cycles, sun spot cycles or any other dates which the user has an interest in using as an attribute for determining when to compile market information. So, IN FILE option 520 provides the user with added flexibility to make custom queries. Option 514 is shown darker than the other options because the user has clicked-on option 514. An interpretation of option 514, as illustrated in FIG. 5A, is constructed in 552 which reads: "January expiration date." Once the user has determined that the query construction shown in compilation 552 is as desired, the user can commit to the query construction by moving the mouse to COMMIT 548 and clicking on COMMIT 548. If the user wishes to cancel the query shown in 552, the user may do so by moving the mouse to CANCEL 550 and clicking on CANCEL 550. This enables the user to start over with attribute selection for the purpose of constructing a query.

FIG. 5B shows the query compilation window on the MIM screen. The attribute selected in FIG. 5A is prompted in FIG. 5B with the <attr> symbol 554. When the user clicks on COMMIT 548, the attribute symbol 554 will be replaced by the query construction 552 which is "January expiration day". So the query illustrated in FIG. 5B will read "show the movement over the previous day of the closing price of IBM repeated for the current and next five days when the date is January expiration day." This then represents an appropriate query compilation. With the query compilation finished in FIG. 5B, the user can proceed to the machine command window, FIG. 5C, to instruct the MIM as to what to do with the query command. Clicking-on EXECUTE 424 will then cause the MIM to execute the query from the query compilation window and display the appropriate values. Clicking on PLOT 426 will command the MIM to plot appropriate marketing information as illustrated in FIGS. 9A–9E. The machine command window, shown in FIG. 5C, also shows the basic structural format of the query illustrated to show the attributes which condition the market information search. Fields 556 through 568 are used to click on with the mouse in order to flesh out the query format and construct a query for compilation. Attribute field 556 is used as an attribute of the desired market information, for example, what stock is desired or what market index is desired. REPEAT 558 will command the MIM to repeat attributes 556. ATTRIBUTE 560 which is a field for determining when market information defines an attribute 560 should be displayed. OP 562 represents an operating field for operating on attributes under the WHEN condition. Attribute 564 is shown enlarged relative to the other fields because it has been clicked on by the mouse and the field is being operated on in the query construction window as illustrated in FIG. 5A where the January expiration date has been selected. Repeat 566 can be used to repeat WHEN conditions in the query format. CUM-ATTR 568 is used for cumulative attribute conditions for the purposes of determining what market information to be queried from the database.

FIG. 6A shows a query construction window which is similar to that described in FIG. 5A except that icon 536 has been clicked on with the mouse and has switched from the "expiration date" to the "triple-witching date." The March date has been selected in field 534. So in FIG. 6A, the 514 option now represents the "March triple-witching day" as shown in the construction interpretation 552. Clicking-on COMMIT 548 will replace attribute 554 in FIG. 6B with "March triple-witching date". This completes the query compilation in FIG. 6B.

FIG. 6C, illustrating the machine command window with a selected query format, again attribute 564 is shown enlarged because it was clicked on and selected by the mouse. This has been determined in the query construction window to be the March triple-witching date 522.

FIG. 7A illustrates a query construction window for determining attributes which determine when to display market information based on stock prices, market indices, such as composite averages for volumes, or other market performance criteria. Command line attribute 702 has been clicked-on by the mouse and is illustrated in darker print than options 704–710. Security field 712 has been filled in with IBM. So the query construction illustrated by 522 is the closing pricing of IBM one day ago plus one point. If this is what the user intended, the user may click-on COMMIT 548 and the construction 522 will be used as the market information attribute 700 as illustrated in the query compilation window of FIG. 7B.

Option 704 enables the user to use volume as an attribute. Field 714 is shown with the Dow Jones Industrial Average (DJIA) Market Index as being selected. Option 706 is used when selecting actual values of stock or commodity prices as an attribute for searching marketing information. The open market price has been selected in field 716 and commodity selected in field 718 is the Deutsch mark (DM). Field 720 illustrates a default option of the same day and Field 722 illustrates a default option of no offset in comparison of the actual value attribute 706.

Option 708 enables the user to switch from actual values to changing values. Icon 724 causes the user to switch between the previous or the next number of days being defined in field 726 which is shown with one time unit. The units can be switched with icon 728. Icon 728 allows selection of days, weeks, months or years as a time unit. The market change information can be made relative to an economic indicator with field 730. Field 730 is shown with the consumer price index (CPI). The number of days which the user is interested in retrieving is entered in field 732. The time period can be switched with icon 734 and icon 736. Icon 738 will provide offsets. Clicking-on icon 738 will provide either positive, negative or no offset. Icon 783 is shown as having a positive offset and the unit is placed in field 740 shown as being one point.

Alternatively, the user may select a constant 710 as a price comparison attribute. Field 742 defines the constant. As illustrated, field 742 is one point. The attribute selected in the query construction window of FIG. 7A will be used in attribute 700 as shown in FIG. 7B. This attribute was selected by the machine command window where attribute 564 is shown enlarged and thus selected in FIG. 7C.

FIG. 8A is a query construction window showing the selection of a price attribute defined by attribute 522 as "one point over the previous day." This is done by selecting the CONSTANT option 802 and filling field 806 with one point. The OVER/PREVIOUS field was selected with icon 810. Limiting it to one day is done by entering one into field 812. The time period is selected with icon 814 as days. Instead of choosing a constant by clicking-on option 802, the user may alternatively choose the PERCENT option 804. The percentage which the user is concerned with is then entered into field 808. When the user clicks-on commit 548, the query shown in FIG. 8B will be completed by replacing attribute 800 with the construction of attribute 522. So the query compilation will read as follows: show the bar chart of IBM repeated for the previous 20 to the next 20 days when the date is in file IBM.DIVS and the closing price of IBM one day ago is down more than one pointover the previous day. This particular compilation represents an example of constructing a query to determine what happens to IBM stock when the day before it goes ex-dividend IBM goes down by more than a point.

FIG. 8C shows the query construction format and the selection of attribute 564. By clicking on plot 526, the MIM will proceed to plot the results of the query shown in FIG. 5B. A plot of the query compiled in the windows of FIGS. 8A, 8B and 8C is illustrated in FIGS. 9A–9E, which are bar charts of IBM repeated for the previous 20 to the next 20 days. In each case, the date and bar which represents the occurrence of the attribute defined in the query compilation of FIG. 8B is represented by dotted line 902.

FIGS. 9A–9E are particularly informative because they illustrate that the price of IBM has decreased in price after the date of interest 902. Thus, the market test defined by the query is in fact a good test for determining when to sell IBM stock or when to short IBM stock. This illustrates the way in which a trader could hypothesize a particular market test for buying or selling stock and then test the hypothesis. Once translated into an ad hoc query by using the query construction tools, in the compilation window, the trader may then proceed to command the MIM to execute the query and plot graphs of the market information.

FIGS. 9A–9E illustrate the ease with which a trader can verify the effectiveness of a particular test by easily discerning the trend of the data from the plots.

c. The Formal Description of the English-Like Query Language

Figure 10:
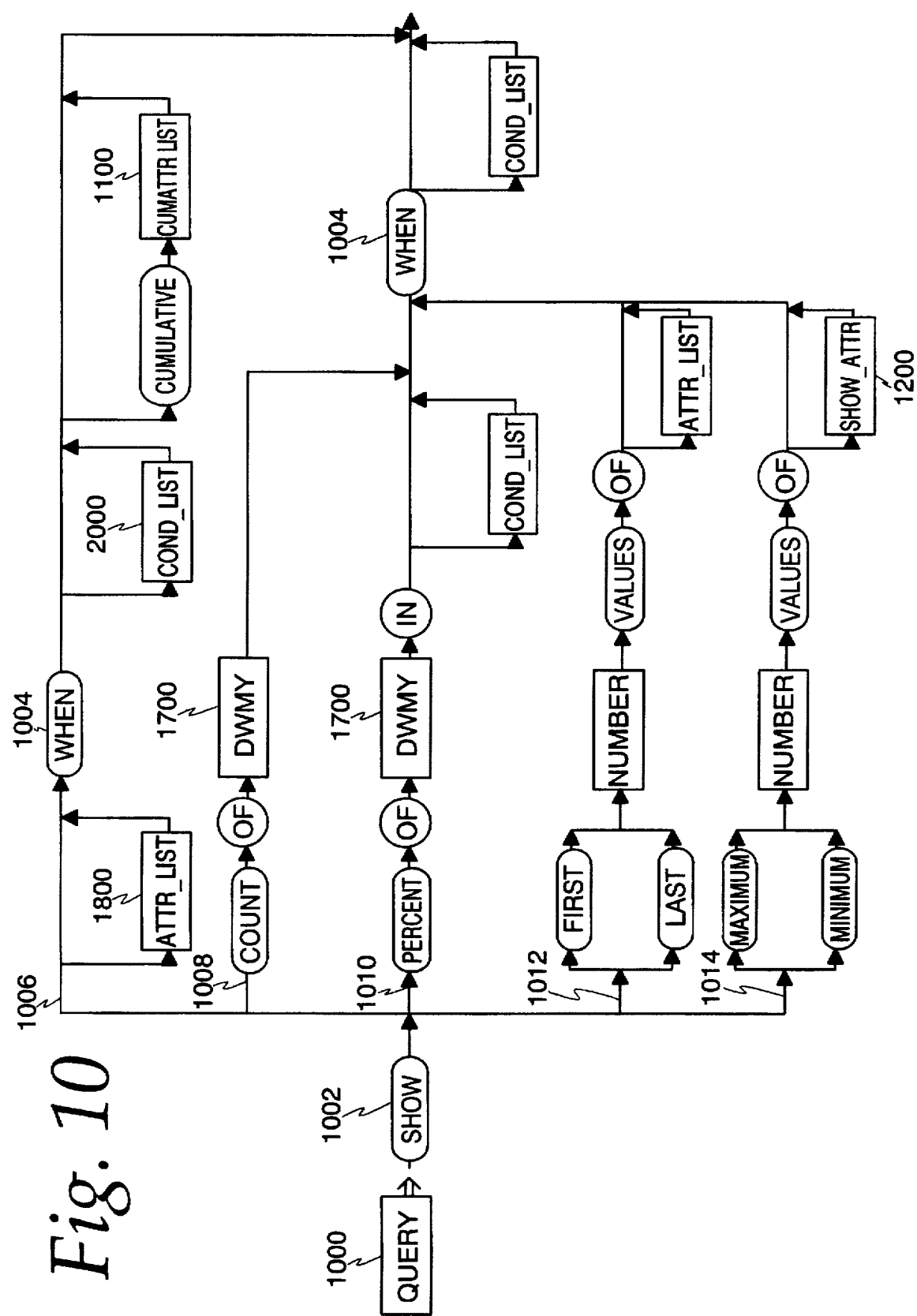

FIGS. 10 through 35 show the syntax charts for the MIMTOOL V.1 language. Turning to FIG. 10, a query 1000 is constructed according to the syntax shown. The query 1000 begins with the command "SHOW" 1002, followed by an attribute to be shown, followed by the command "WHEN" 1004, followed by a condition list. There are five general query constructs, 1006, 1008, 1010, 1012 and 1014. In query construct 1006, an attribute is shown outright when it meets the given conditions. In query construct 1008, the count of days, weeks, months, or years is shown for occurrences according to the given conditions. In query construct 1010 a percent of time or occurrences within a larger "universe" of time or occurrences, defined by a condition list, is shown when the given "WHEN" conditions are met. In query construct 1012, the first or last selected number of values of selected attributes are shown when they meet the given conditions. In query construct 1014, the maximum or minimum selected number of values of a single attribute are shown when they meet the given conditions.

In FIG. 11, a cumulative attribute list operator syntax 1100 is shown. A cumulative attribute operator may be selected in query construct 1006. Note that pathway 1102 allows more than one cumulative attribute operator to be selected for a given query construct.

FIG. 12 shows the "show attribute" function syntax 1200. Attributes are shown for selection in all five of general query constructs, either as attributes to be displayed, or as elements of "WHEN" conditions. Attributes may be shown either directly or as a "study" 1202. In item 1206, the actual series of data defining the attribute is selected, such as a particular stock, the Dow Jones Industrial Average, Standard and Poors Index, the Consumer Price Index, or other series, by way of example. If a selected series 1206 has more than one "column" of data, such as open, high, low, close, and so on, the column is selected in item 1204. A time offset 1208 may also be selected, indicating the data should be extracted from a period different from the time frame of the query construct, such as a certain number of days ago, or a certain number of weeks later, for example.

Figure 13:
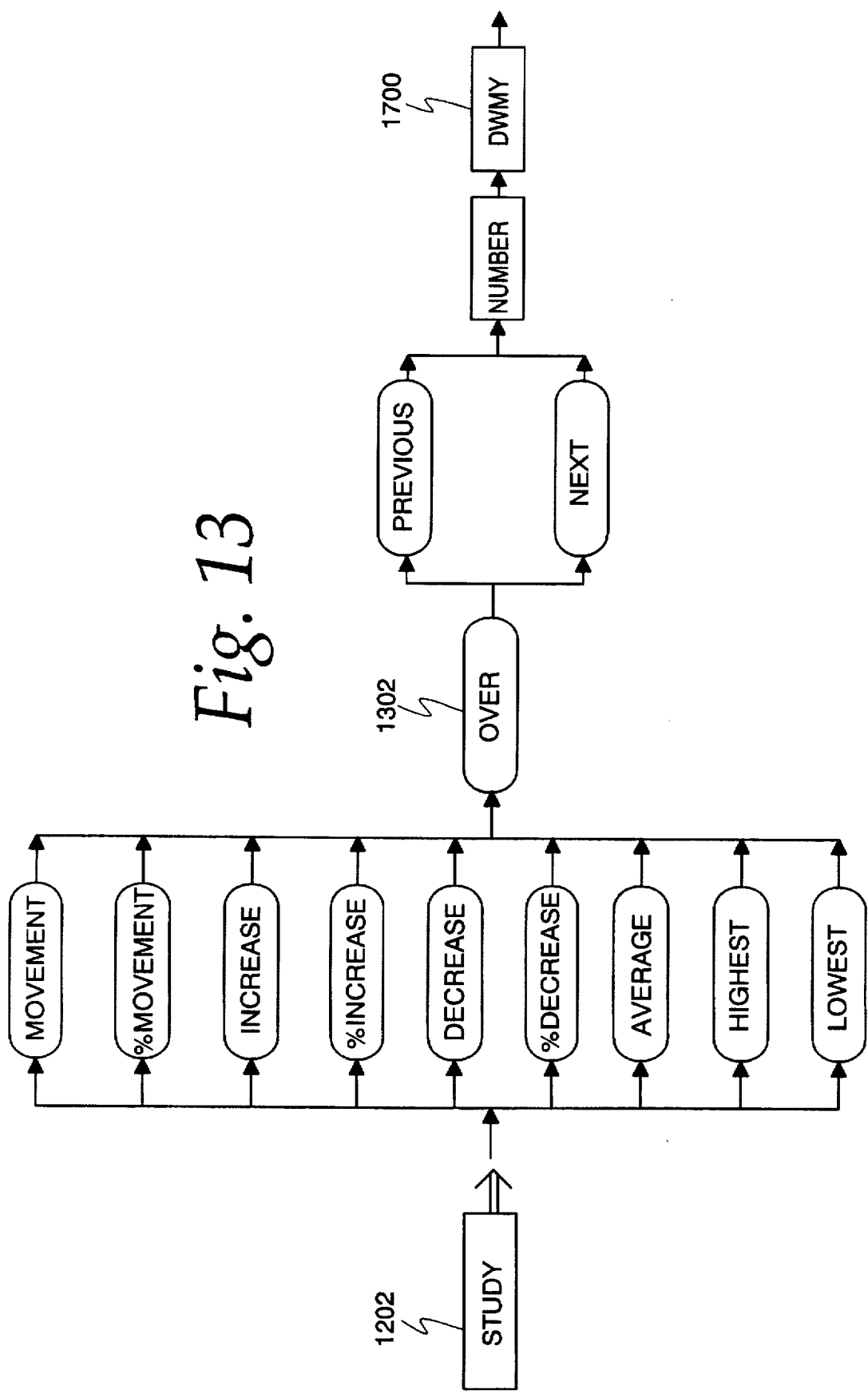

Turning now to FIG. 13, the variety of studies 1202 which may be performed on a given series is shown. Each of the studies requires a time frame over which the study is carried out. This is selected by the "OVER" command 1302. The time frame is defined as the "previous" or "next" certain number of units of time with respect to the time frame of the query construct.

Figure 14:
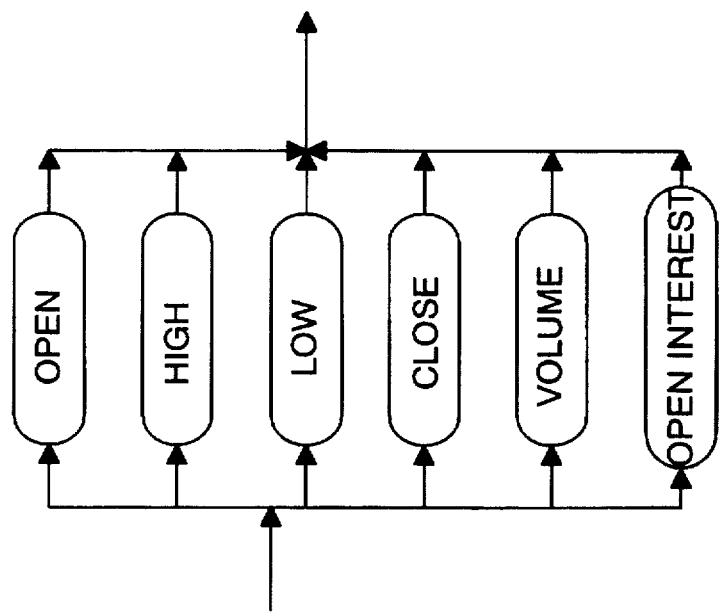

In FIG. 14, the columns 1204 of a series of data are shown. For a given series of data, such as for a selected stock, one may thus choose to show the opening, high, low, closing stock price, the volume of the stock traded, or the open interest on the financial instrument, by way of example.

Figure 15:
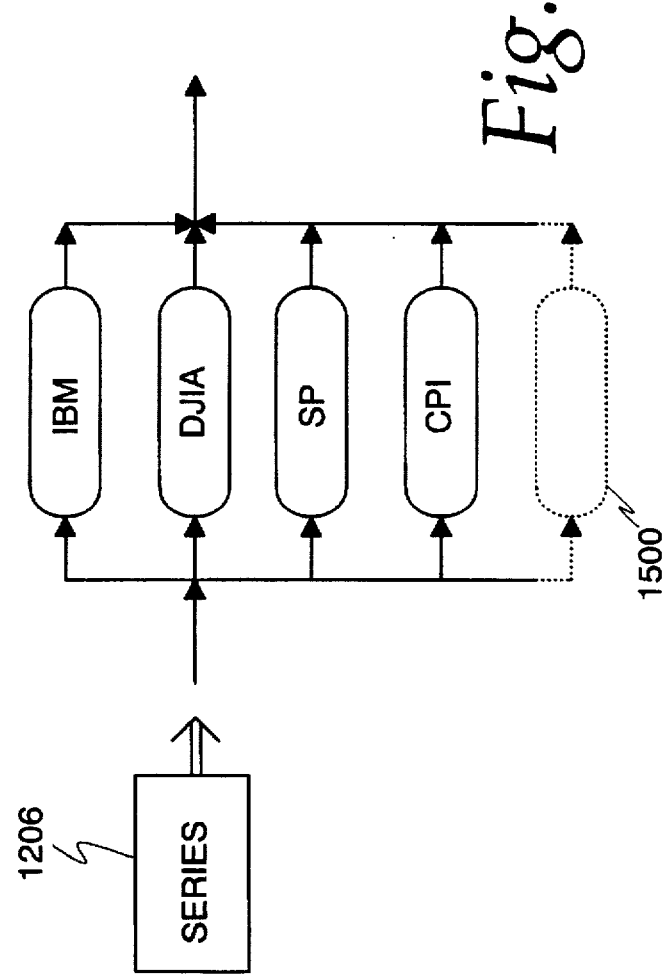

In FIG. 15, it is shown that any of a series of data may be selected as an attribute to be shown. These include, but are not limited to, stocks and other traded financial instruments, and important trading indices. Item 1500, shown in a broken line, indicates that the user may add new series of data to the system. As a result, the user has query access to data which may not normally be included in commonly available trading market databases. Such a series might be in the form of periodically released statistics on auto production, crop production, trade figures, reports on particular stocks and companies, and so on, by way of example.

In FIG. 16, is shown the format of the time offset 1208. The time offset may be selected to be previous to or later than the time frame of the query construct, indicating the data should be extracted from a period different from the time frame of the query construct, such as a certain number of days ago, or a certain number of weeks later, for example.

In FIG. 17, the format 1700 of a selection of units of time is shown. Thus, queries may be constructed to examine series data over periods of time defined by the units days, weeks, months and years.

Turning now to FIG. 18, the format of an attribute list is shown. The attribute to be shown is constructed in item 1200, and repeat syntax 1900 may be used to show the attribute or the study of the attribute repeatedly for a number of units of time. The "AND" operator 1802 permits an indefinitely long attribute list to be constructed.

Figure 19:
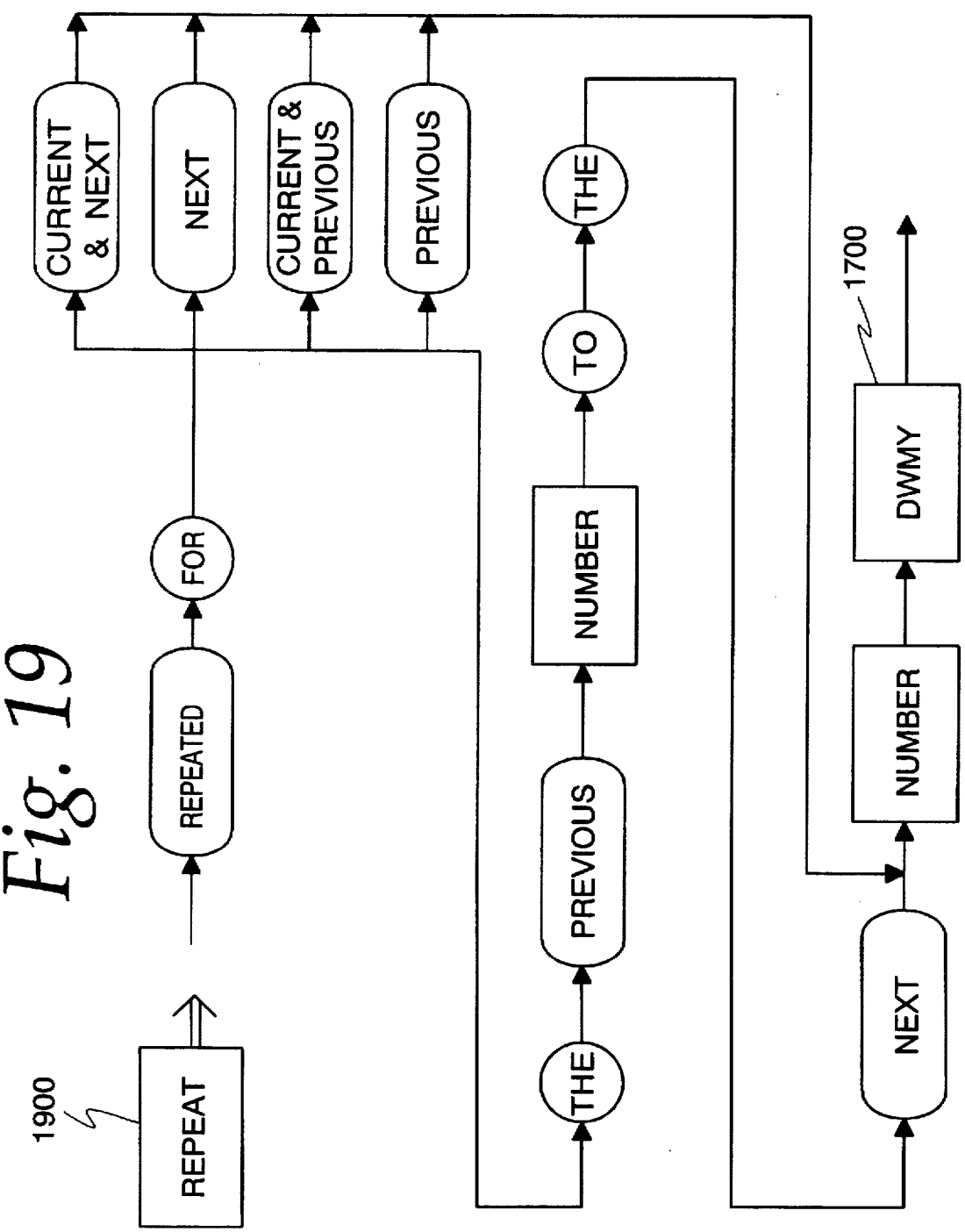

Turning now to FIG. 19, the detailed format of the repeat syntax 1900 is shown. Using the repeat syntax, a series or a study of a series may be shown repeatedly for a selected number of consecutive units of time relative to the time frame of the query construct. For example, one may choose to show the movement over the previous day of the closing price of a particular stock repeated for the current and previous four weeks. Alternatively, one may choose to show the movement over the previous day of the closing price of a particular stock repeated for the previous five days to the next five days, by way of example.

Figure 20:
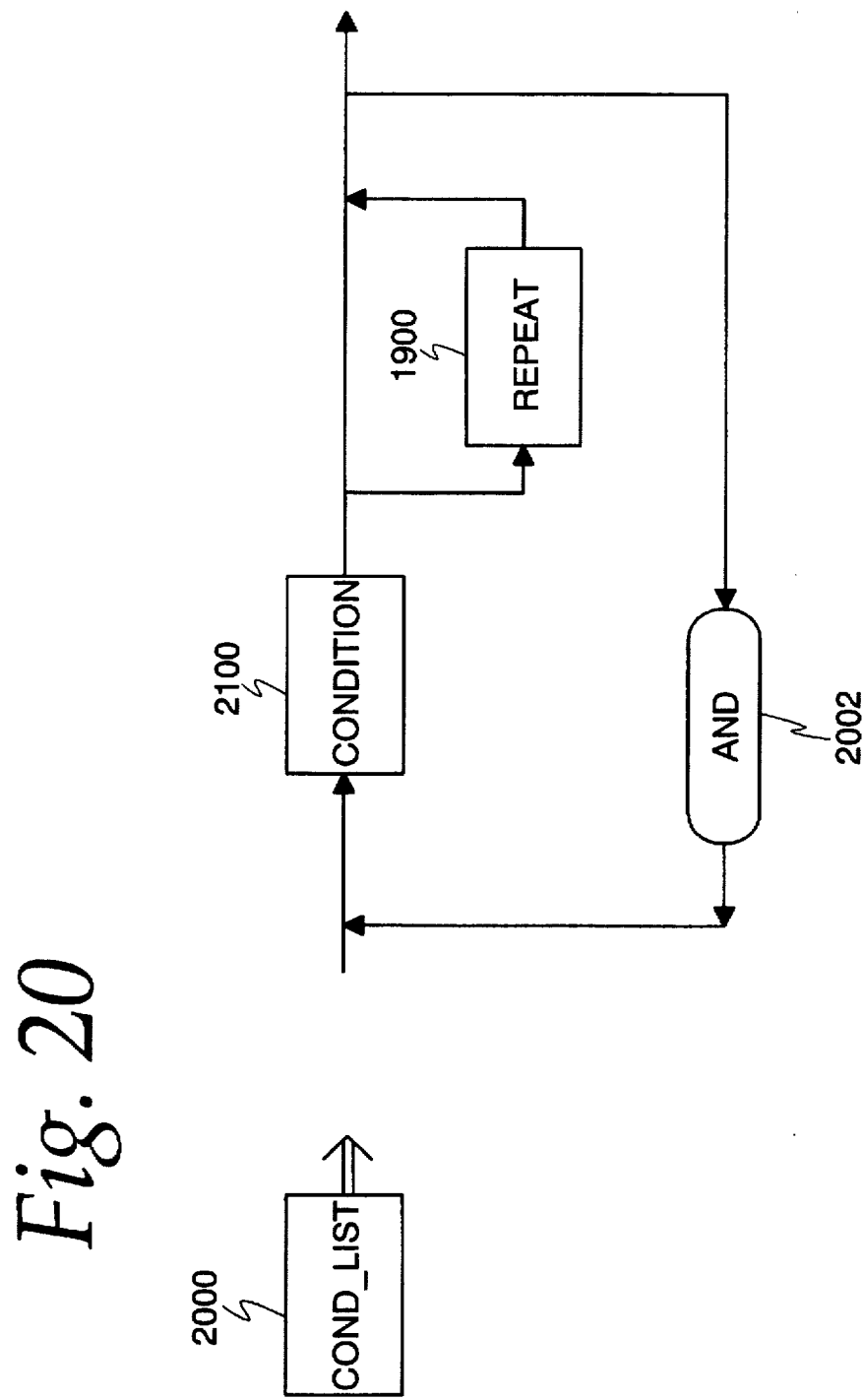

Turning now to FIG. 20, the format is shown of the condition list 2000 used to condition a series of data or a study of a series of data to be shown. Conditions may be repeated in the repeat format 1900 in much the same way as attributes are repeated. The "AND" operator 2002 permits the user to construct an indefinitely long condition list.

Figure 21:
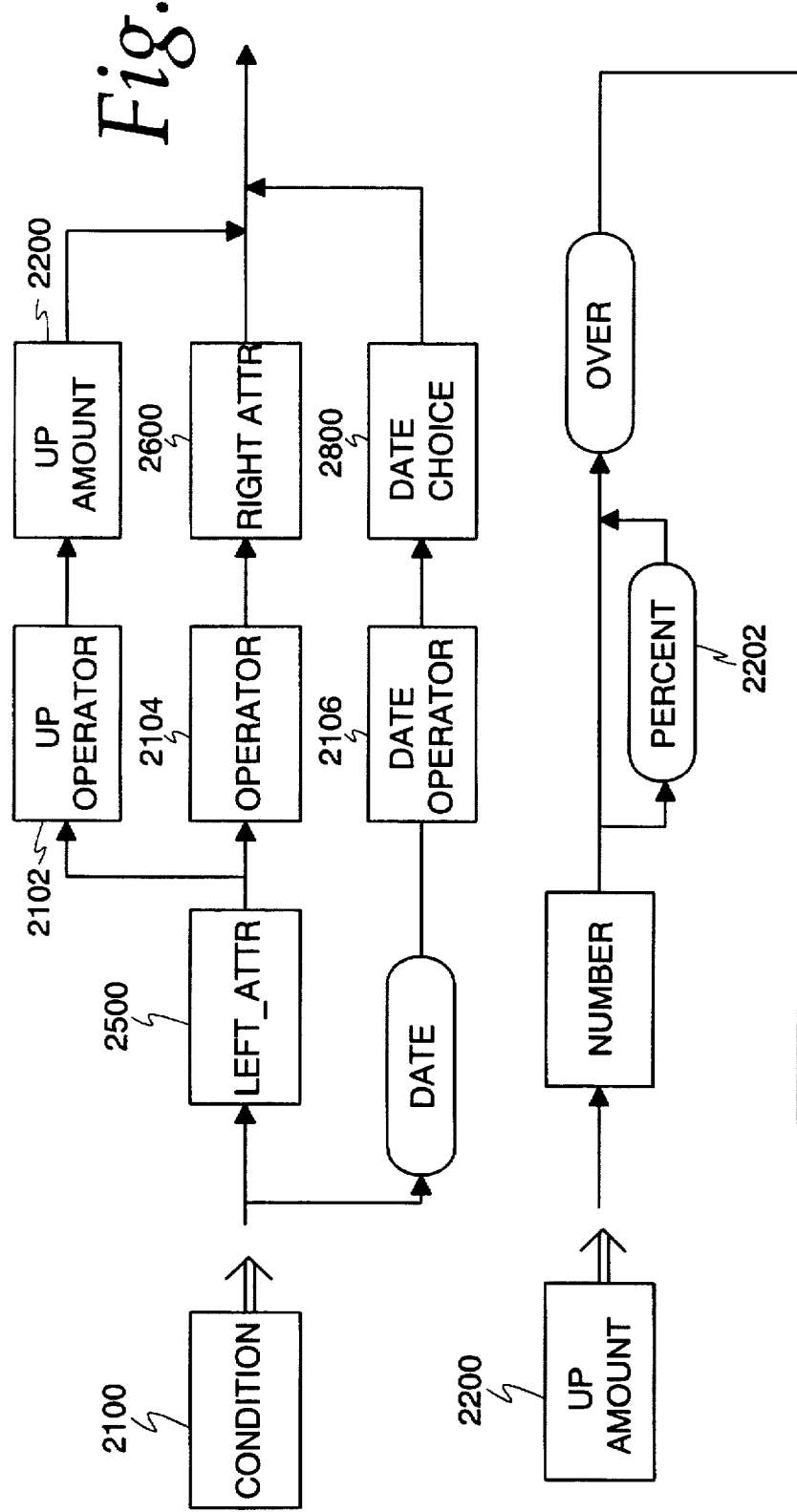

In FIG. 21, the format of a single condition 2100 is shown. There are three general types of conditions. In the path which contains the date operator 2106, the data selected to be shown is conditioned by a selection operation based on time. In the path containing the operator 2104, the data is conditioned by a comparison between a first, or "left", attribute and a second, or "right", attribute. The right attribute may be as simple as a constant, or as complicated as an entire attribute construct with studies 1202, columns 1204, and arithmetic operations on the data. In the path which contains the "UP" operator 2102, the data selected is conditioned by the progress of an attribute over time.

Figure 22:
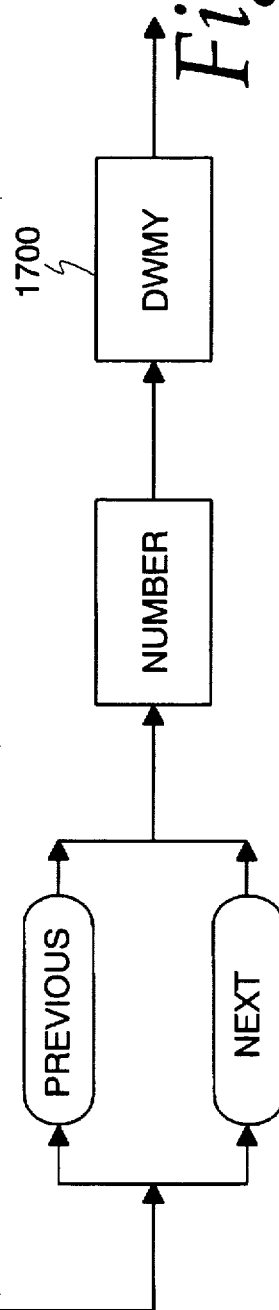

Turning now to FIG. 22, the format is shown of a condition on the progress of an attribute over time, indicated as "up amount" 2200. The progress is defined by a percent change 2202 over a period of time defined by the time units 1700.

FIG. 35 shows the syntax of the "UP" operator 2102.

FIG. 23 shows a comparison operator syntax 2104 for use in a condition 2100. Operator 2104 is used to compare said left and right attributes.

In FIG. 24, a data operator 2106 is selected for a condition 2100.

FIG. 25 shows that the syntax for defining a left attribute 2500 for a condition 2100 is the same as the syntax for constructing the attributes 1200 to be shown.

FIG. 26 shows that a right attribute 2600 for a condition 2100 may be constructed in a fashion identical to the construction of the left attribute 2500, or may be a number 2602, or may be an attribute upon which an arithmetic operation is carried out through the arithmetic operator 2604.

In conjunction, then, the syntax for the left attribute 2500, right attribute 2600, and operator 2104 may be used to develop a condition for a query such as: " . . . WHEN the closing price of <a first particular stock> is more than the closing price of <a second particular stock>*1.5."

In FIG. 27 are shown the four basic operators which may be used as the arithmetical operator 2604.

Figure 28:
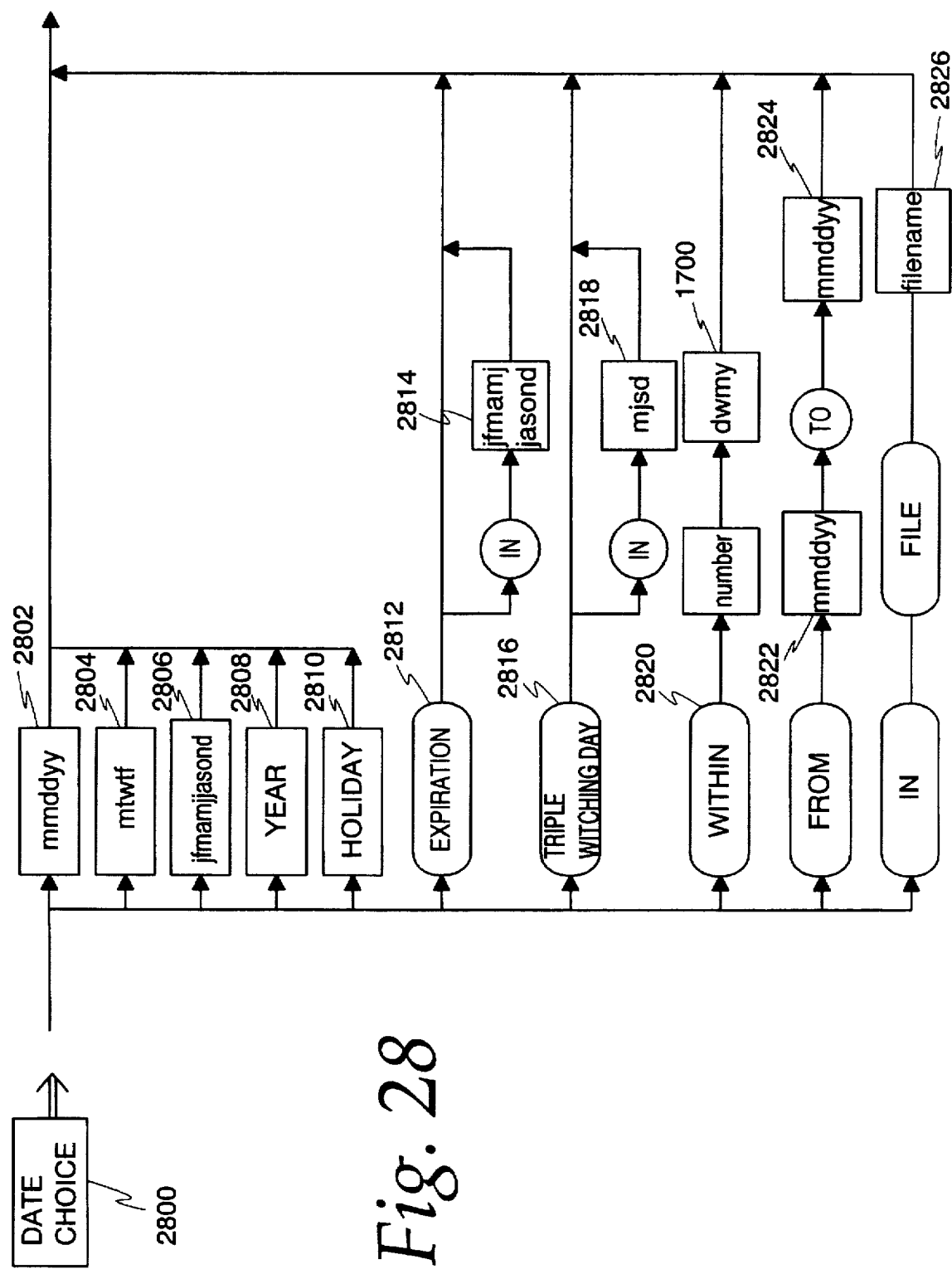

FIG. 28 shows the syntax for the selection of a data choice 2800 to be included in a date condition. The date may be as simple as an outright date 2802, a day of the week 2804, a month of the year 2806, a year 2808, or a particular holiday 2810. Alternatively, the date choice 2800 may be the expiration 2812 of a stock or financial instrument series addressed in the query construct, or may specify the expiration 2812 to occur in a particular month 2814. The date choice 2800 may also be any triple-witching day 2816 or else a triple-witching day 2816 in one of the four periods 2818 signified by either March, June, September or December. The date choice 2800 may be chosen to be within a number of time units 2820 or within a specific time frame, from a certain date 2820 to a certain date 2824.

Finally, the date choice 2800 may be found in a file of dates 2826. This last option gives the user the flexibility to add the effects of certain special events to the query, which might not otherwise be included in a typical analysis, because of the difficult of addressing such special events in standard database and economic analyses systems. For example, dates which are not normally available in common stock and financial instrument databases, such as the dates on which certain market-related or market-unrelated reports are released to the public, may be included in the query to observe the effect on the series or study of series to be shown. By allowing access to a file of dates, the system enables the user to customize the query to conditions very specific to the domain knowledge of the user. For example, the dates of the release of auto production figures by the government are not typically found in common financial instrument databases, and are not easily included in standard query systems, yet may show useful correlation to changes in stock prices, which correlation may be easily tested with the system of the present invention.

A file of such dates may also include numeric data related to those dates upon which the query may also perform, said numeric data being defined as a series 1206. Thus, to use the aforementioned example, a user could add to the system the dates on which auto production figures are released, and also the figures themselves.

Figure 29:
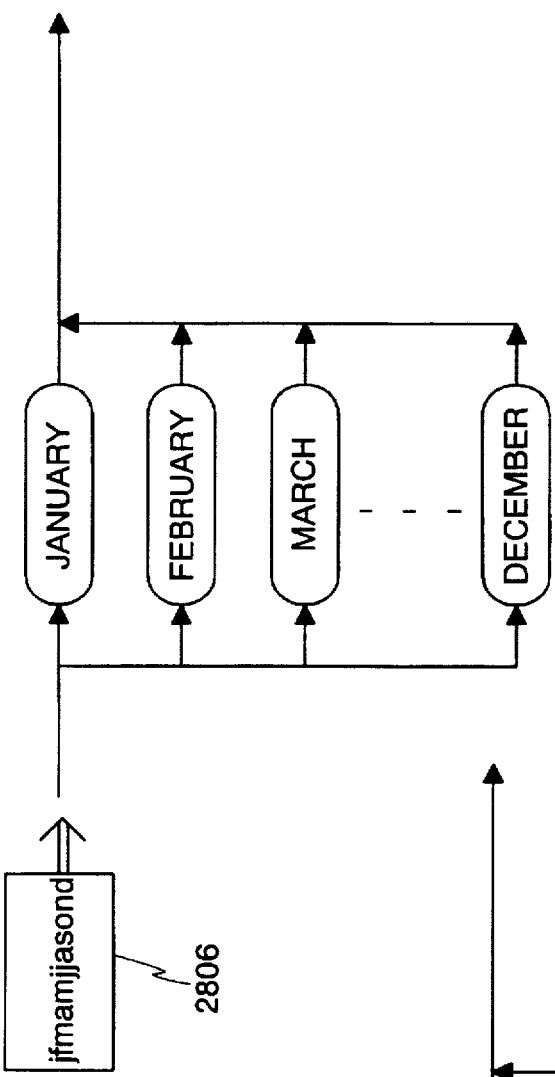

In FIG. 29 is shown the syntax for selecting a month name 2806 for a date choice 2800.

Figure 30:
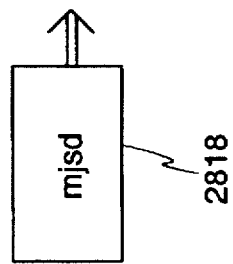

In FIG. 30 is shown the format for the selection of a month 2818 from the set of March, June, September and December for use in a date choice 2800 based on a triple witching date 2816.

Figure 31:
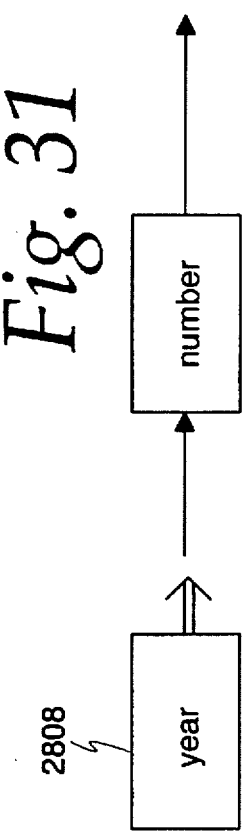

FIG. 31 shows that a year syntax 2808 selected for a date choice 2800 is simply a number.

FIG. 32 shows the format for a holiday 2810, which may be selected for a date choice 2800. The ability to select holidays adds to the flexibility of the system of the present invention, as such dates may not normally be available for querying in other database systems.

Figure 33:
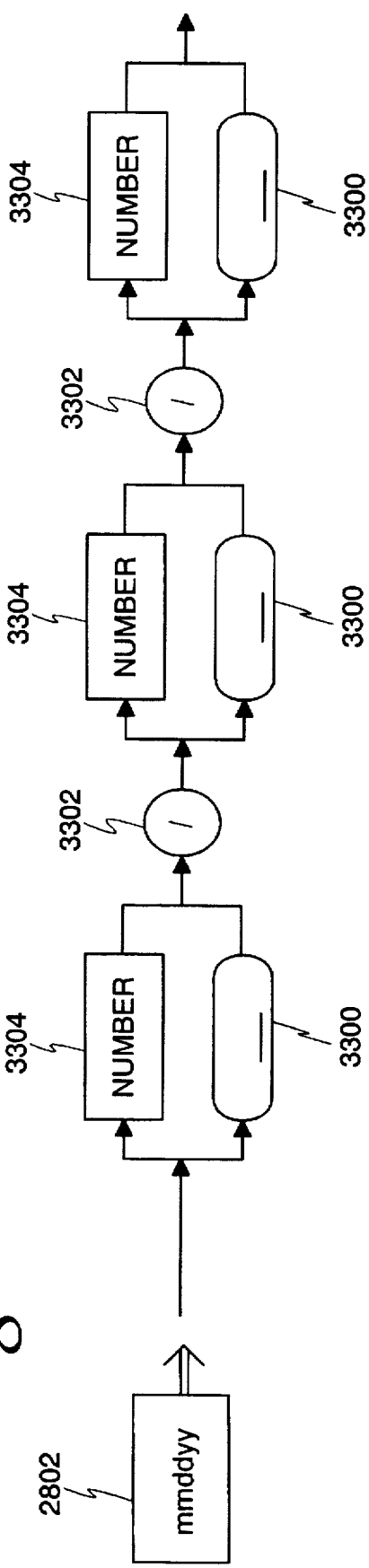

Turning now to FIG. 33, the format is shown for a date 2802 for selection as a date choice 2800. The format is a standard date format wherein the numbers 3304 are separated by slashes 3302. In the case that the day, the month, or the year of the date 2802 need not be limited to any particular number, an underscore character 3300 may be selected in place of a number 3304.

Figure 34:
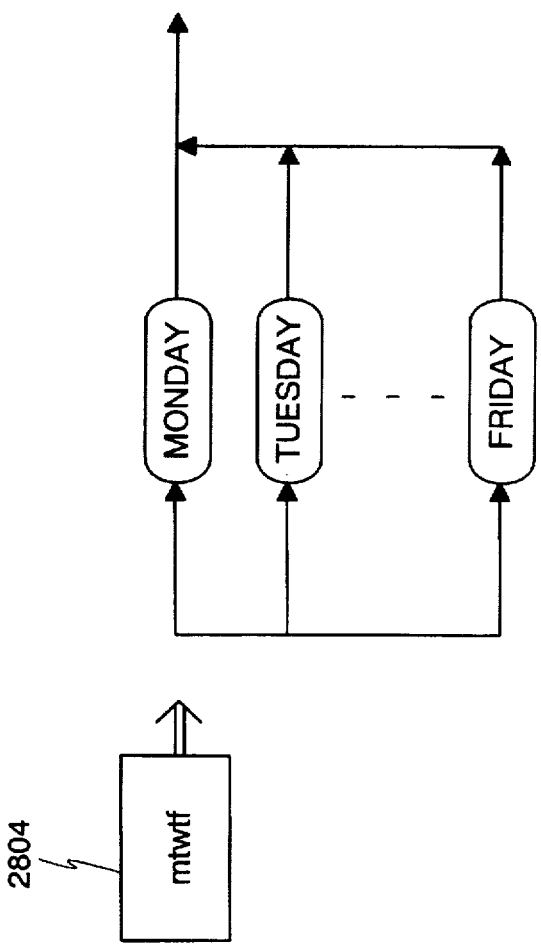

FIG. 34 shows the syntax for a day of the week 2804 to be used in a date choice 2800.

While there has been described the preferred embodiment of the invention, numerous modifications and changes will occur to those skilled in the art. It is therefore intended by the appended claims to define all such modifications and changes as fall within the true spirit and scope of the invention.

What is claimed is:

1. A computerized data retrieval system comprising:

a data base containing information defining the fluctuation of commodity prices over time in combination with additional information designating the date of occurrence of events;

a windowing user search request creation and revision system embodying a formal search language that permits the definition of search requests in their entirety by means of windowing templates, that includes a facility for ANDing and ORing search request portions together, and that includes a facility for limiting any search request to commodity price information dated proximate in time to at least one said designated event;

search execution means for performing search requests formulated through the use of said windowing system;

report generation means for generating reports presenting the results of searches executed by said search execution means; and echo means connected to receive search request defining information from said windowing system for echoing a search request formulated with said windowing system to the user in the form of a near-natural-language search request while the user is formulating said search request using said windowing system.

2. A system in accordance with claim 1 which includes means for generating at least three distinct regions visible to a user on a display screen, including one region in which a near-natural language view of a search request appears, a second window in which user-selectable command options appears, and a third region in which user search query formulation templates appear.

3. A system in accordance with claim 2 wherein the sequence of said formulation templates are pre-defined based upon previous selection of said command options.

4. A system in accordance with claim 2 wherein each said formulation template is contingent upon the appropriate response of the user to a previous said template.

5. A system in accordance with claim 1 to which is added near-natural-language search request user editing means for entering and/or revising near-natural-language search requests, to which is added reverse echo means connected to send search request defining information to said windowing system for sending a search request formulated and/or revised with said user editing means back to a said windowing system, and in which said search execution means can perform search requests formulated through use of said user editing means as well as through use of said windowing system.

6. A system in accordance with claims 1 wherein the market knowledge comprises calendar events such as the days of the week, the beginning of months, quarters, and years, and the like and in which the search language and windowing system are designed to facilitate use of such events in search requests.

7. A system in accordance with claims 1 wherein the market knowledge comprises calendar events such as national holidays and the like and in which the search language and windowing system are designed to facilitate use of such events in search requests.

8. A system in accordance with claim 1 wherein the market knowledge information comprises market-relevant events such as triple-witching hours and option contract expiration dates and in which the search language and windowing system are designed to facilitate use of such events in search requests.

9. A system in accordance with claim 1 wherein the market knowledge information includes periodically occurring event information and an associated value with each such event, such as the date of issuance and the value of company earning reports, of the consumer price index, and the like, and wherein said formal search language and windowing system are designed to facilitate use of such events in search requests and also to facilitate limiting the retrieved information in some manner by the event's associated value.

10. A system in accordance with claim 1 wherein the market knowledge information includes values that fluctuate daily and wherein said formal search language and windowing system are designed to facilitate use of such values to limit in some manner the amount of information that is retrieved.

11. A system in accordance with claim 1, wherein the windowing user search request creation and revision system permits the user to choose from and customize seven general query formats with user-defined conditions, said formats including:

a first format which displays commodity price information satisfying said conditions, a second format which displays a count of occurrences satisfying said conditions, a third format which displays a percentage of occurrences satisfying said conditions within a larger set of occurrences satisfying a second set of conditions, a fourth format which displays a chronologically first user-selected number of commodity price information values satisfying said conditions, a fifth format which displays a chronologically last user-selected number of commodity price information values satisfying said conditions, a sixth format which displays a user-selected number of largest commodity price information values satisfying said conditions, and a seventh format which displays a user-selected number of least commodity price information values satisfying said conditions.

12. A system in accordance with claim 1, wherein the windowing user search request creation and revision system permits the user to choose from and customize three general condition formats, said formats including:

a first format conditioning commodity price information with date-related limitations, a second format conditioning commodity price information with a comparison between a first set of commodity price information and a second set of commodity price information, and a third format conditioning commodity price information with a percentage change criterion in a third set of commodity price information.

13. A method for assisting a user in formulating a search request preparatory to retrieving information from a data base containing multiple sets of information values, with each set containing multiple values corresponding to different times and/or dates, and also containing at least one other set of information defining the dates of occurrence of events, comprising the steps of:

displaying a series of templates to the user to guide the user through the process of formulating an information retrieval search request;

accepting from the user information defining selections made by the user when presented with said templates;

using said selection-defining information provided by the user as a guide, formulating and displaying to the user near-natural-language search requests accurately stating the search the user has formulated so far;

displaying templates to the user that permit the user to combine multiple search request portions using AND and/or OR logical operators;

displaying templates to the user that permit a portion of any search request to be qualified to retrieve information dated proximate to at least one of said events; and when a search request is completely formulated, converting it into a form suitable for presentation to a search execution engine.

14. A method in accordance with claim 13 to which is added the steps of accepting from the user information defining revisions to be made to said near-natural-language search request, revising said near-natural-language search request accordingly, redisplaying said near-natural-language search request to the user, and adjusting said series of templates so that their organization and contents matches the revised near-natural-language search request.

* * * * *